(12) United States Patent
Liu

(10) Patent No.: US 11,476,956 B2
(45) Date of Patent: Oct. 18, 2022

(54) COMPACT ANTENNA TEST RANGE EQUIPMENT

(71) Applicant: WAVEPRO INCORPORATED, Taoyuan (TW)

(72) Inventor: Rong-Chung Liu, Taoyuan (TW)

(73) Assignee: WAVEPRO INCORPORATED, Taoyuan (TW)

( * ) Notice: Subject to any disclaimer, the term of this patent is extended or adjusted under 35 U.S.C. 154(b) by 0 days.

(21) Appl. No.: 17/203,055

(22) Filed: Mar. 16, 2021

(65) Prior Publication Data

US 2022/0303029 A1    Sep. 22, 2022

(51) Int. Cl.
| | |
|---|---|
| H04B 17/14 | (2015.01) |
| H04B 17/16 | (2015.01) |
| H04B 17/21 | (2015.01) |
| H01Q 17/00 | (2006.01) |
| H01Q 15/18 | (2006.01) |

(52) U.S. Cl.
CPC ............. *H04B 17/14* (2015.01); *H01Q 15/18* (2013.01); *H01Q 17/00* (2013.01); *H04B 17/16* (2015.01); *H04B 17/21* (2015.01)

(58) Field of Classification Search
CPC ........ H04B 17/14; H04B 17/16; H04B 17/21; H04B 17/00; H01Q 15/18
See application file for complete search history.

(56) References Cited

U.S. PATENT DOCUMENTS

| | | | | |
|---|---|---|---|---|
| 10,746,775 | B1* | 8/2020 | Luley | H01Q 15/16 |
| 2020/0119460 | A1* | 4/2020 | Maruo | G01R 29/105 |
| 2020/0217885 | A1* | 7/2020 | Rowell | G01R 31/3025 |
| 2020/0264222 | A1* | 8/2020 | Luley | H01Q 3/16 |
| 2020/0325771 | A1* | 10/2020 | Alvarez | E21B 49/003 |
| 2020/0386800 | A1* | 12/2020 | Derat | G01R 29/0871 |
| 2021/0055337 | A1* | 2/2021 | Kobayashi | G01R 29/0864 |
| 2021/0293869 | A1* | 9/2021 | Kobayashi | G01R 31/2874 |

* cited by examiner

*Primary Examiner* — Junpeng Chen
(74) *Attorney, Agent, or Firm* — Guice Patents PLLC

(57) ABSTRACT

A compact antenna test range equipment of the invention includes a microwave darkroom including a plurality of walls connected to each other, a reflector disposed in the microwave darkroom and comprising a reflecting surface having a polygon shape comprising a plurality of edges and a plurality of corners, each of the corners is located between two of the edges, wherein each of the corners aiming at one of the walls, a feeding antenna disposed in the microwave darkroom and corresponding to any position of the reflecting surface, and a test turning table disposed in the microwave darkroom and configured to bear a testing piece which is disposed in a quiet zone and exited by a plane electromagnetic wave. The feeding antenna transmits electromagnetic waves to the reflecting surface so as to generate a plane electromagnetic waves or receive electromagnetic waves from the quiet zone.

10 Claims, 24 Drawing Sheets

COMPACT ANTENNA TEST RANGE EQUIPMENT

BACKGROUND OF THE INVENTION

Field of the Invention

The invention relates to antenna testing equipment, and more particularly to a compact antenna testing range equipment reducing scattering of electromagnetic wave to obtain electromagnetic waves with uniform amplitude and phase in a quiet zone.

Description of the Related Art

Characteristic tests such as general communication products or radars must be tested at a place where the signal source is far away, that is, where the electromagnetic wave that excites the object under test has shown a form close to a uniform plane wave. But another test method is to use the Compact Antenna Test Range (CATR) Reflector, which uses the compact antenna test field reflector. It corrects the phase wave front by using the path difference of the electromagnetic wave reflected by the compact curvature reflecting surface in the microwave darkroom, and can generate electromagnetic waves in a short distance equivalent to the plane electromagnetic waves generated by long-distance propagation. The uniformity of the amplitude and phase of the plane electromagnetic wave generated in the test quiet zone is the most important indication factor of the quality of CATR. Up to now, the compact antenna test range equipment is still known as a well applied and accurate test field for the test of communication products or radars.

As shown in FIG. 1, an edge of the reflector of the CATR is either serrated edge or roll-edged, and the overall design shape is substantially square or rectangular. Because the edge of the reflector is parallel to the wall of the microwave darkroom, the electromagnetic waves reflected and scattered by the edge of the reflector will illuminate the walls with a larger energy and a larger incident angle with respect to the normal direction of the absorbing material on the wall (the ceiling, the floor and the side walls), which generates scattered electromagnetic waves, especially at lower operating frequencies. These scattered electromagnetic wave energy enters the quiet zone to interfere with the uniform plane electromagnetic wave (uniform plane wave) expected in the quiet zone and thus increases the amplitude ripple and phase ripple, whereby the accuracy of the test is affected.

BRIEF SUMMARY OF THE INVENTION

An object of the invention is to provide a compact antenna testing range equipment. The compact antenna testing range equipment can reduce the angle and energy of the electromagnetic waves reflected and scattered by the edge of the reflecting surface of the reflector illuminates the wall of the compact antenna testing range equipment, so that the interference wave (clutter) entering the test quiet zone is reduced, and the test quiet zone has a high-quality uniform plane wave (uniform plane wave).

The invention provides a compact antenna test range equipment. The compact antenna test range equipment in accordance with an exemplary embodiment of the invention includes a microwave darkroom including a plurality of walls connected to each other, a reflector disposed in the microwave darkroom and comprising a reflecting surface having a polygon shape comprising a plurality of edges and a plurality of corners, each of the corners is located between two of the edges, wherein each of the corners aiming at one of the walls, a feeding antenna disposed in the microwave darkroom and corresponding to any position of the reflecting surface, and a test turning table disposed in the microwave darkroom and configured to bear a testing piece which is disposed in a quiet zone and exited by a plane electromagnetic wave. The feeding antenna transmits electromagnetic waves to the reflecting surface so as to generate a plane electromagnetic waves or receive electromagnetic waves from the quiet zone.

In another exemplary embodiment, the microwave darkroom has four walls, and the reflecting surface has a diamond shape having four corners.

In yet another exemplary embodiment, the reflecting surface has two diagonal lines.

In another exemplary embodiment, the diagonal lines are perpendicular and have identical length.

In yet another exemplary embodiment, the walls have wave absorbing material and wave absorbing structures.

In another exemplary embodiment, the feeding antenna transmits the electromagnetic waves to a center of the reflecting surface, and the testing piece aims at the center to be excited by the plane electromagnetic waves.

In yet another exemplary embodiment, the feeding antenna and the testing piece are disposed on the wall serving as a ground, and the reflecting surface has an inclined angle with respect to the ground.

In another exemplary embodiment, the feeding antenna corresponds to one of the corners of the reflecting surface near the ground.

In yet another exemplary embodiment, the feeding antenna corresponds to one lateral corner of the reflecting surface.

In another exemplary embodiment, the test turning table comprises a rotating mechanism altering an angle of a normal line of the testing piece with respect to wave front of the plane electromagnetic waves.

The compact antenna test range equipment of the prevent invention includes the reflector with the corners aiming at the wall of the microwave darkroom. The electromagnetic waves reflected and scattered by the corners of the reflector are weak, so the electromagnetic waves incident on the wall of the microwave darkroom are relatively weak. Therefore, the scattered interference clutter generated by the wall is relatively weak. The reflected and scattered electromagnetic waves generated by the edge of the reflective surface are farther away from the wall of the microwave darkroom, and the energy illuminating to the wall is lower. It has a small off-normal angle of incidence and good absorption. Therefore, the scattered interference clutter is relatively weak. Based on the above factors, it will not interfere with the quality of the uniform plane electromagnetic wave in the quiet zone of the test. In addition, the electromagnetic waves reflected by the corners of the reflector to the turntable of the test piece located in the center of the test quiet zone are also weak, and the scattered interference waves generated by the turntable mechanism are also much smaller. The compact antenna test range equipment of the present invention can also retain the advantages of low interaction interference between the reflected wave and the feed antenna in the conventional corner feed structure.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
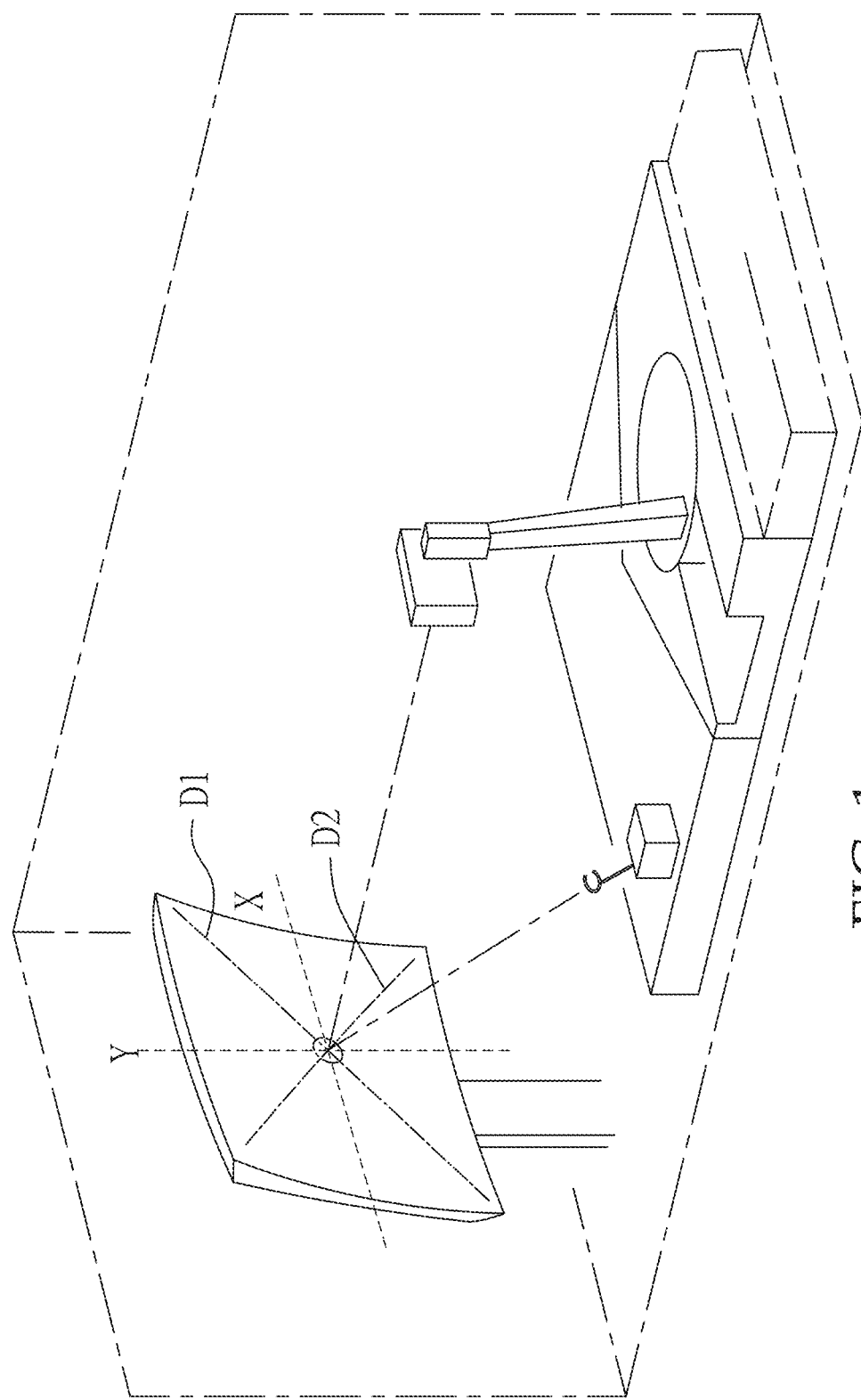
FIG. 1 is a perspective view of a conventional compact antenna test range equipment.

The following description is of the best-contemplated mode of carrying out the invention. This description is made for the purpose of illustrating the general principles of the invention and should not be taken in a limiting sense. The scope of the invention is best determined by reference to the appended claims.

Please refer to FIG. 2, FIG. 3, FIG. 5, and FIG. 6, which show an embodiment of the compact antenna test range equipment of the present invention. The compact antenna test range equipment 100 of this embodiment includes a microwave darkroom 10, a reflector 20, a feeding antenna 30, and a test piece turntable 40. The microwave darkroom 10 includes a plurality of wall surfaces 11, 12, 13, 14 which are connected adjacently. The wall surfaces 11, 12, 13, and 14 are provided with absorbing materials and absorbing structures, such as pyramidal absorbing materials and absorbing structures.

Figure 5:
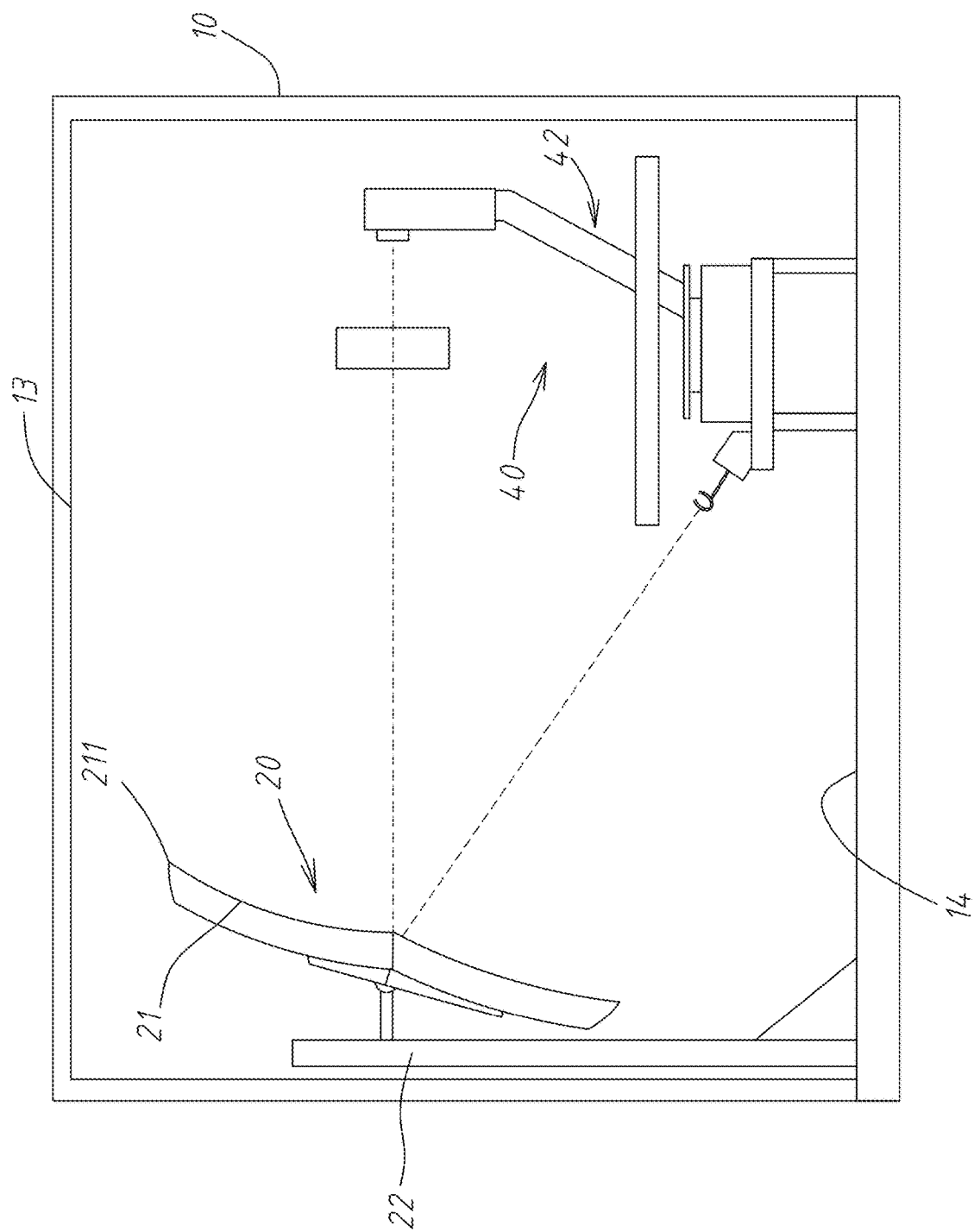
FIG. 5 is a side view of the compact antenna test range equipment of FIG. 2.
Figure 6:
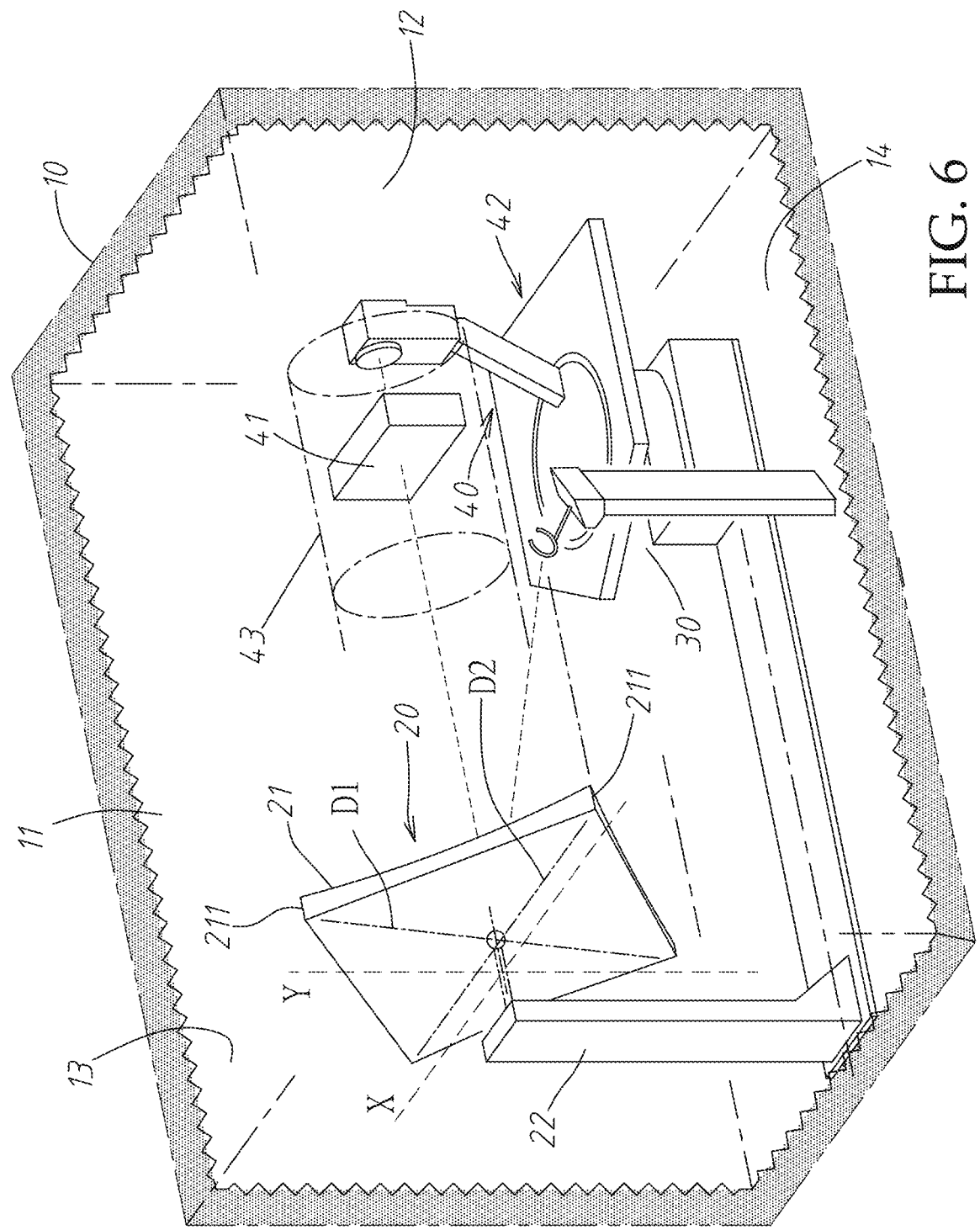
FIG. 6 is a perspective view of another embodiment of a compact antenna test range equipment of the present invention.
Figure 7:
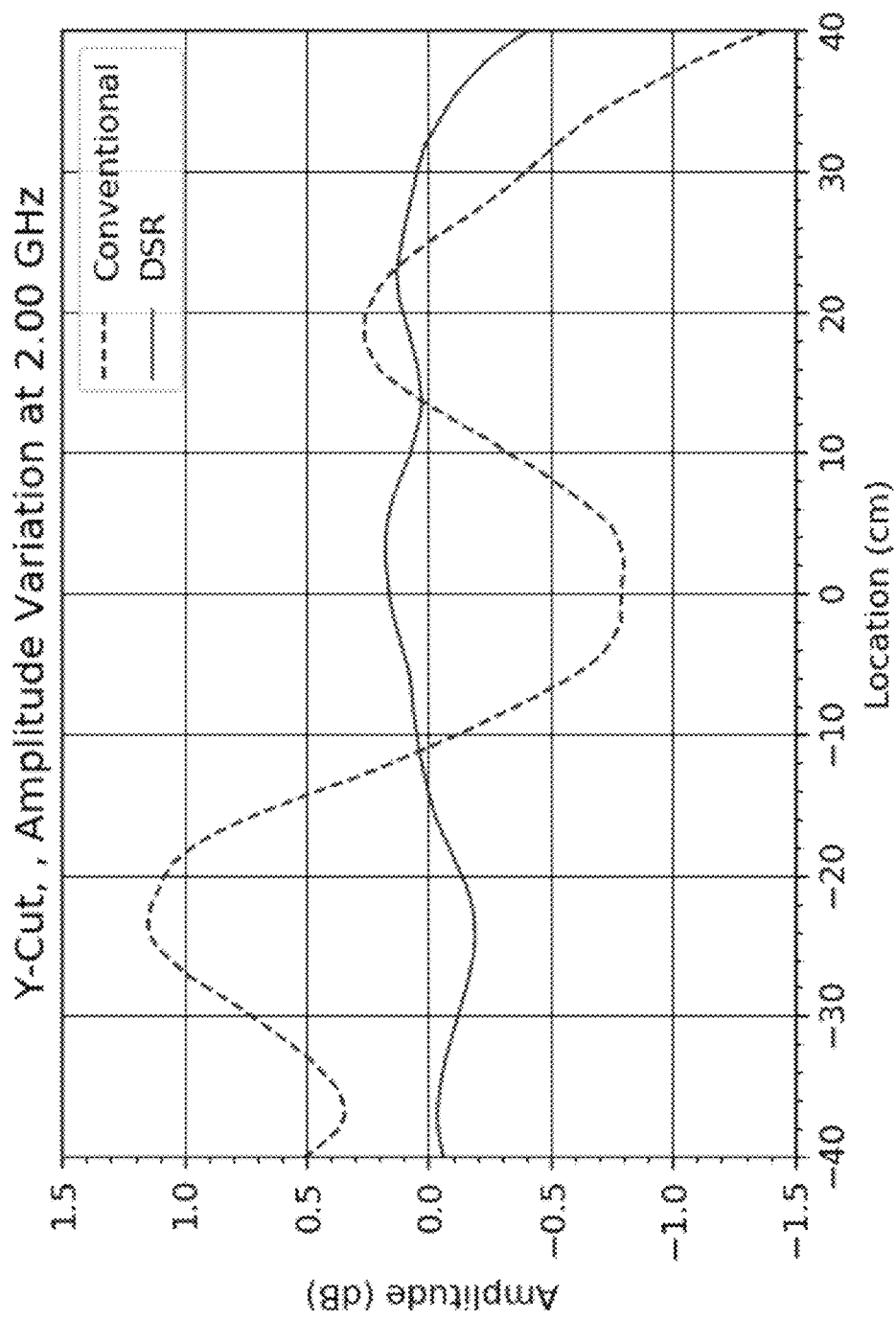
FIG. 7 shows the test result of variation of the amplitude of the plane electromagnetic wave in the quiet zone at frequency of 2.0 GHz generated by the compact antenna test range equipment of FIG. 6 and the conventional compact antenna test range equipment shown in FIG. 1 in the same-sized microwave darkroom and reflective surface.
Figure 8:
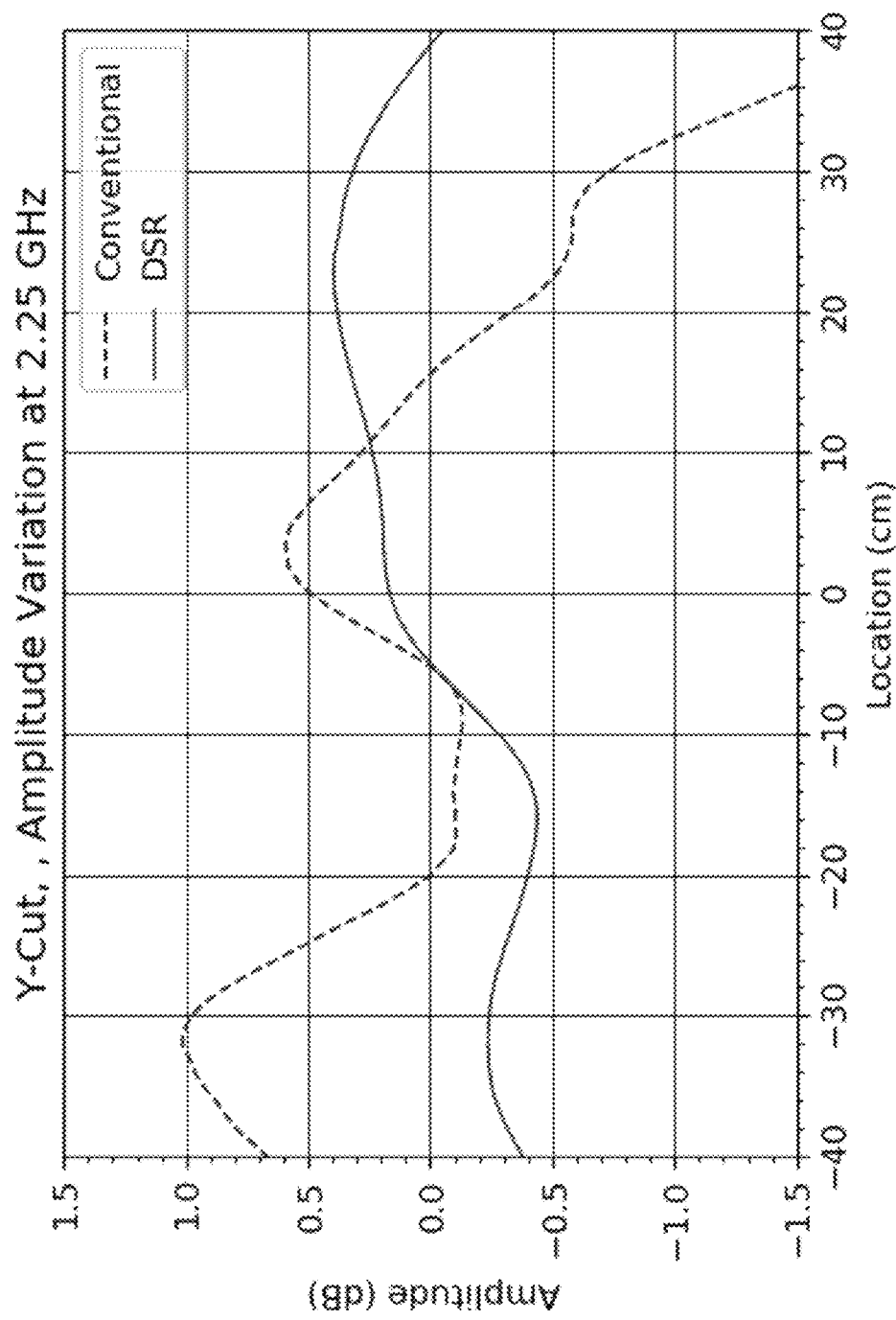
FIG. 8 shows the test result of variation of the amplitude of the plane electromagnetic wave in the quiet zone at frequency of 2.25 GHz generated by the compact antenna test range equipment of FIG. 6 and the conventional compact antenna test range equipment shown in FIG. 1 in the same-sized microwave darkroom and reflective surface.
Figure 9:
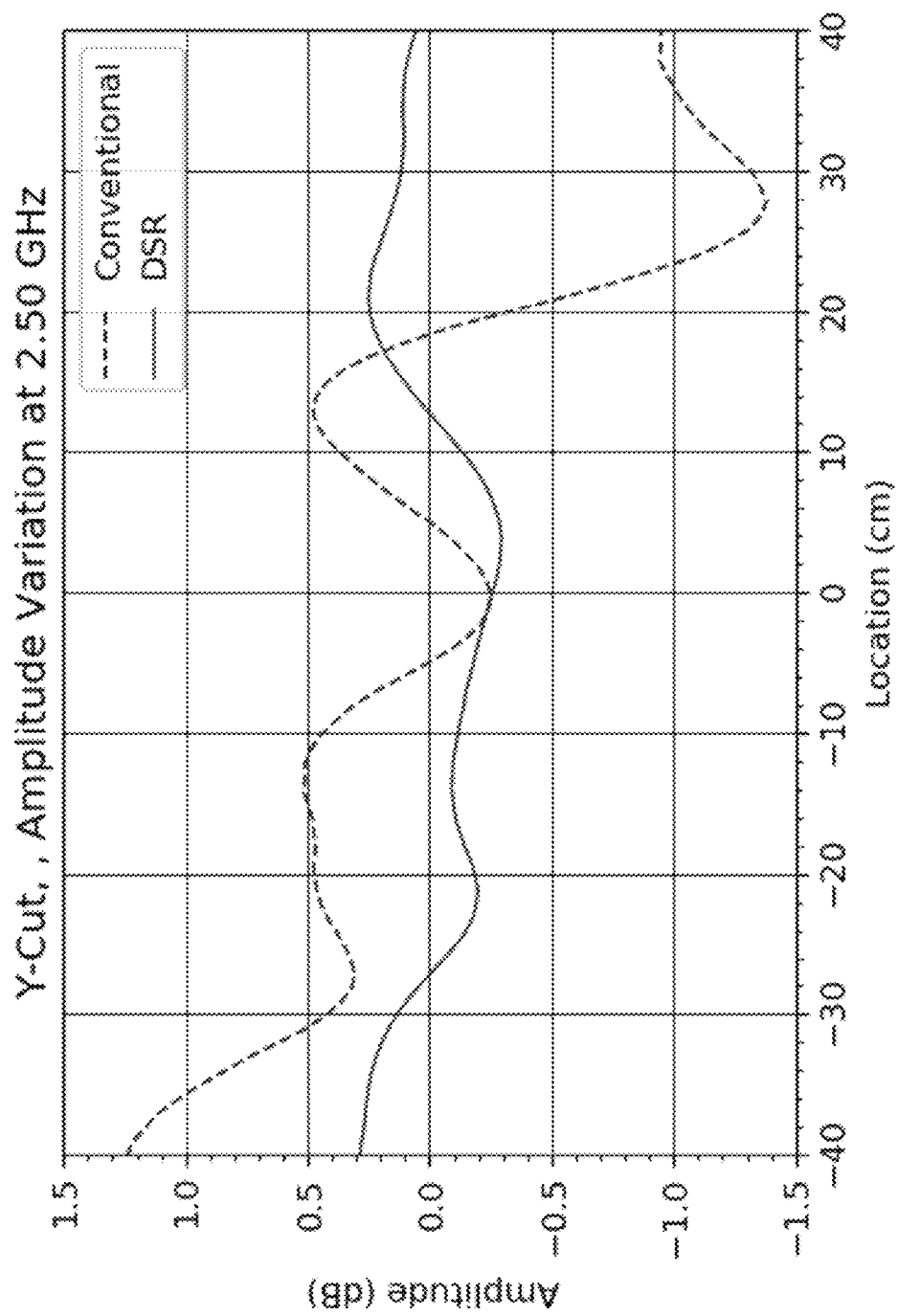
FIG. 9 shows the test result of variation of the amplitude of the plane electromagnetic wave in the quiet zone at frequency of 2.5 GHz generated by the compact antenna test range equipment of FIG. 6 and the conventional compact antenna test range equipment shown in FIG. 1 in the same-sized microwave darkroom and reflective surface.
Figure 10:
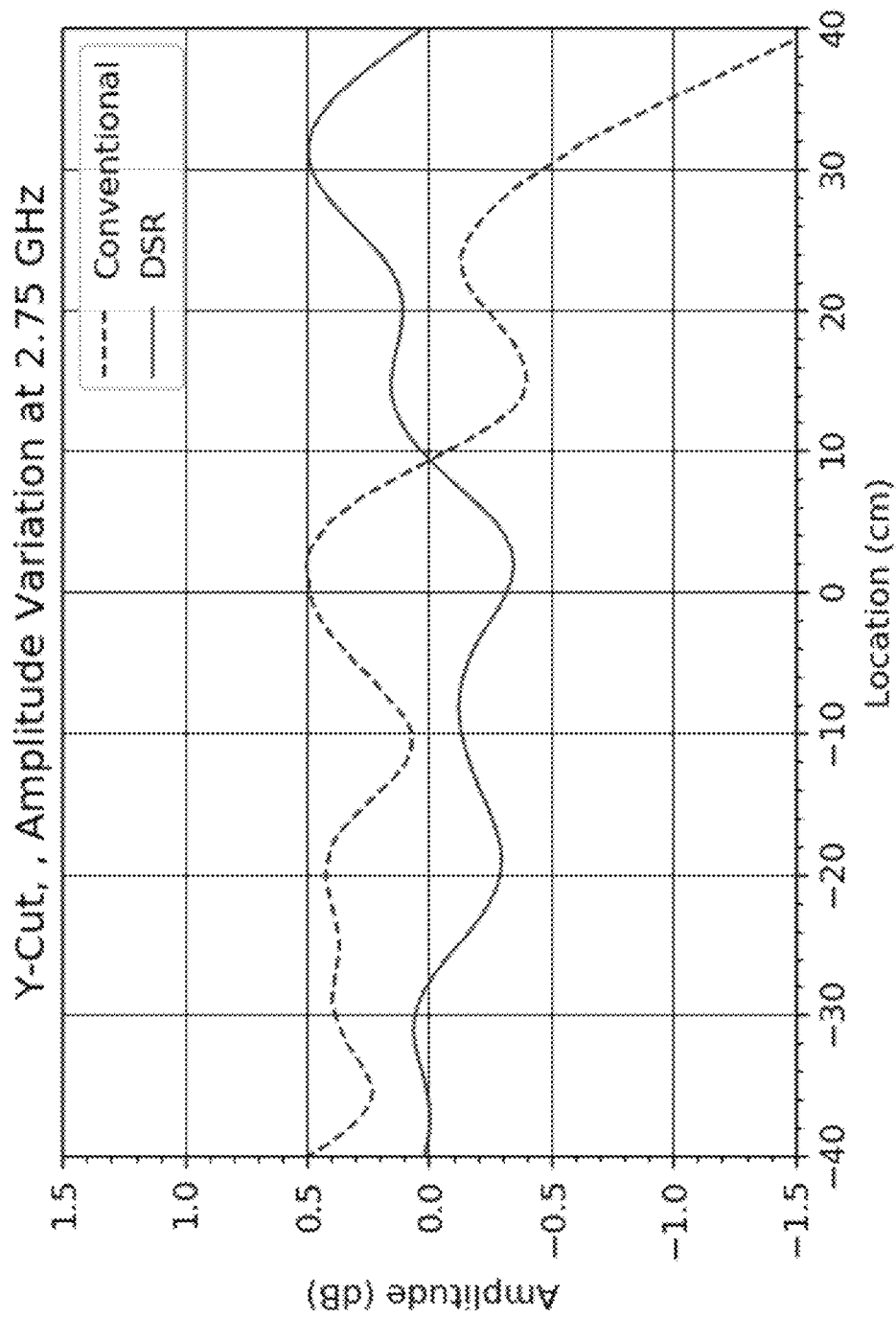
FIG. 10 shows the test result of variation of the amplitude of the plane electromagnetic wave in the quiet zone at frequency of 2.75 GHz generated by the compact antenna test range equipment of FIG. 6 and the conventional compact antenna test range equipment shown in FIG. 1 in the same-sized microwave darkroom and reflective surface.
Figure 11:
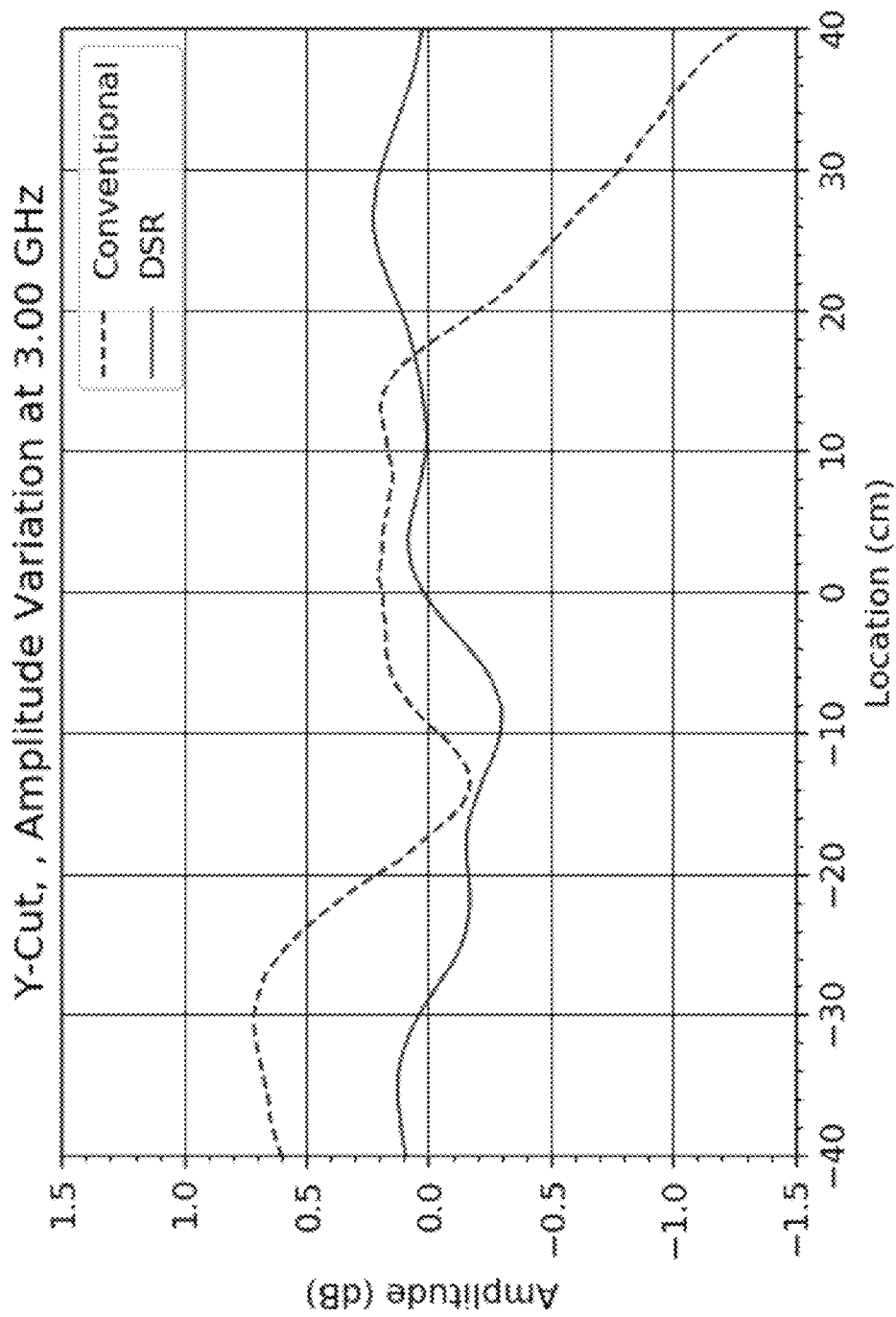
FIG. 11 shows the test result of variation of the amplitude of the plane electromagnetic wave in the quiet zone at frequency of 3.00 GHz generated by the compact antenna test range equipment of FIG. 6 and the conventional compact antenna test range equipment shown in FIG. 1 in the same-sized microwave darkroom and reflective surface.
Figure 12:
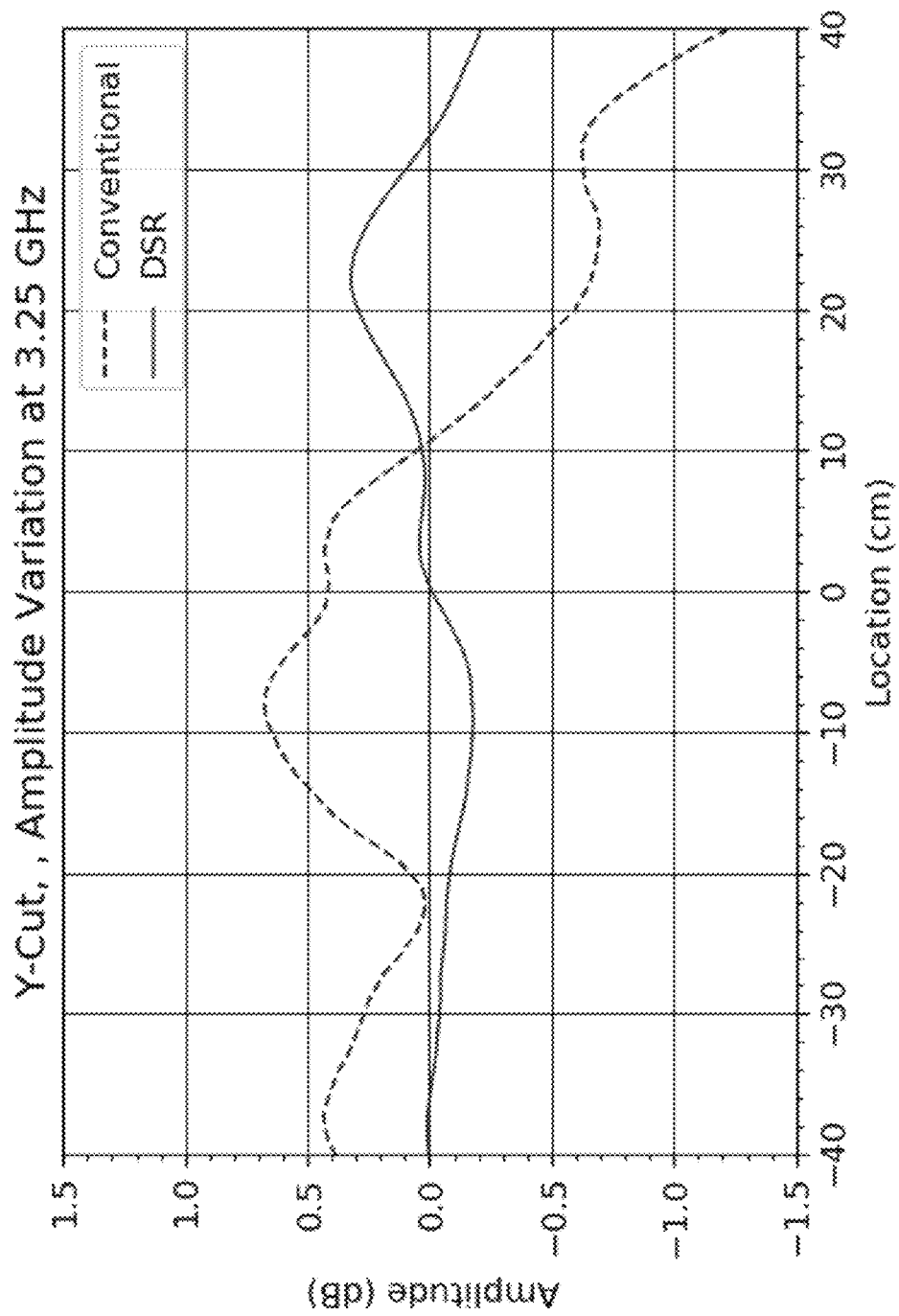
FIG. 12 shows the test result of variation of the amplitude of the plane electromagnetic wave in the quiet zone at frequency of 3.25 GHz generated by the compact antenna test range equipment of FIG. 6 and the conventional compact antenna test range equipment shown in FIG. 1 in the same-sized microwave darkroom and reflective surface.
Figure 13:
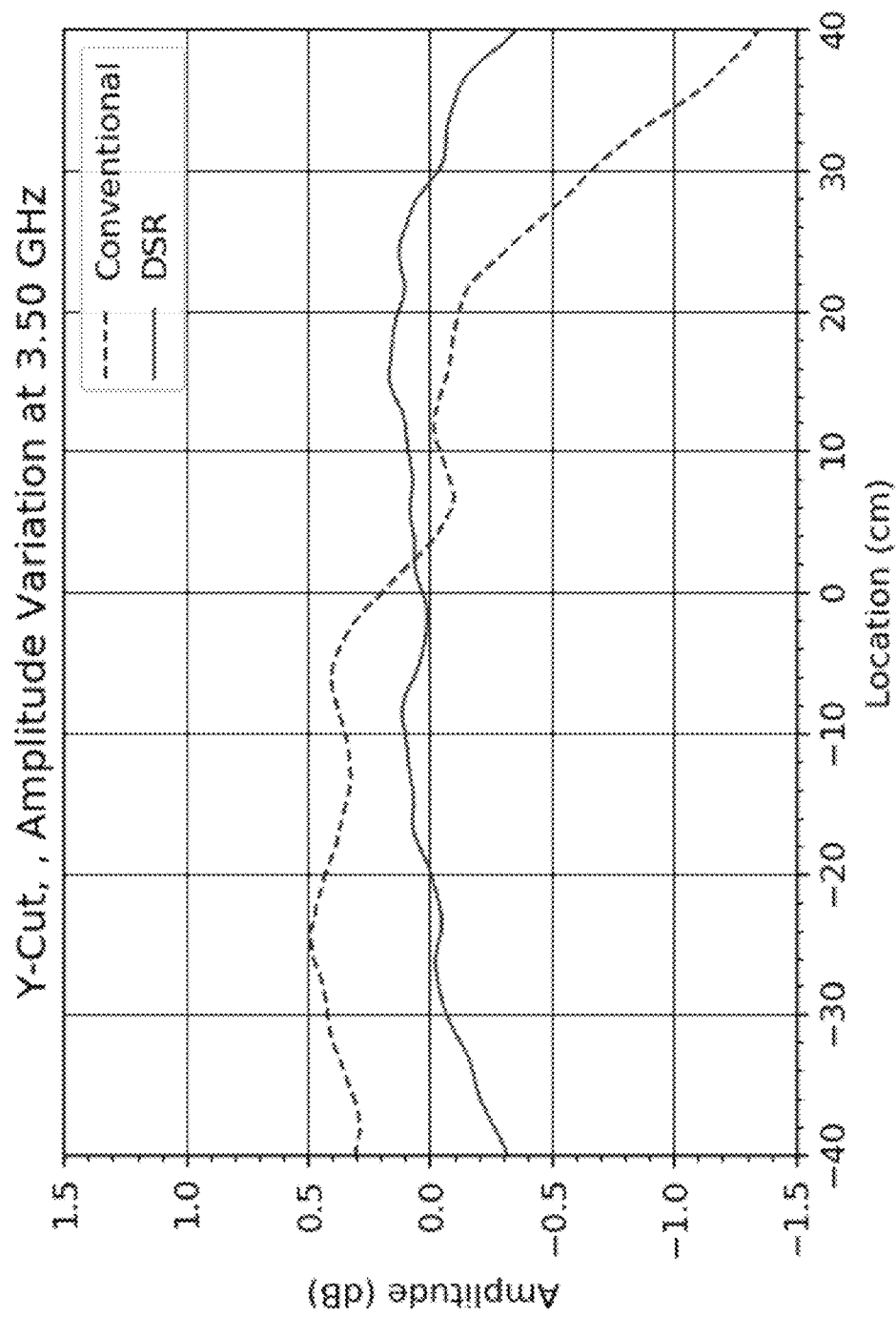
FIG. 13 shows the test result of variation of the amplitude of the plane electromagnetic wave in the quiet zone at frequency of 3.50 GHz generated by the compact antenna test range equipment of FIG. 6 and the conventional compact antenna test range equipment shown in FIG. 1 in the same-sized microwave darkroom and reflective surface.
Figure 14:
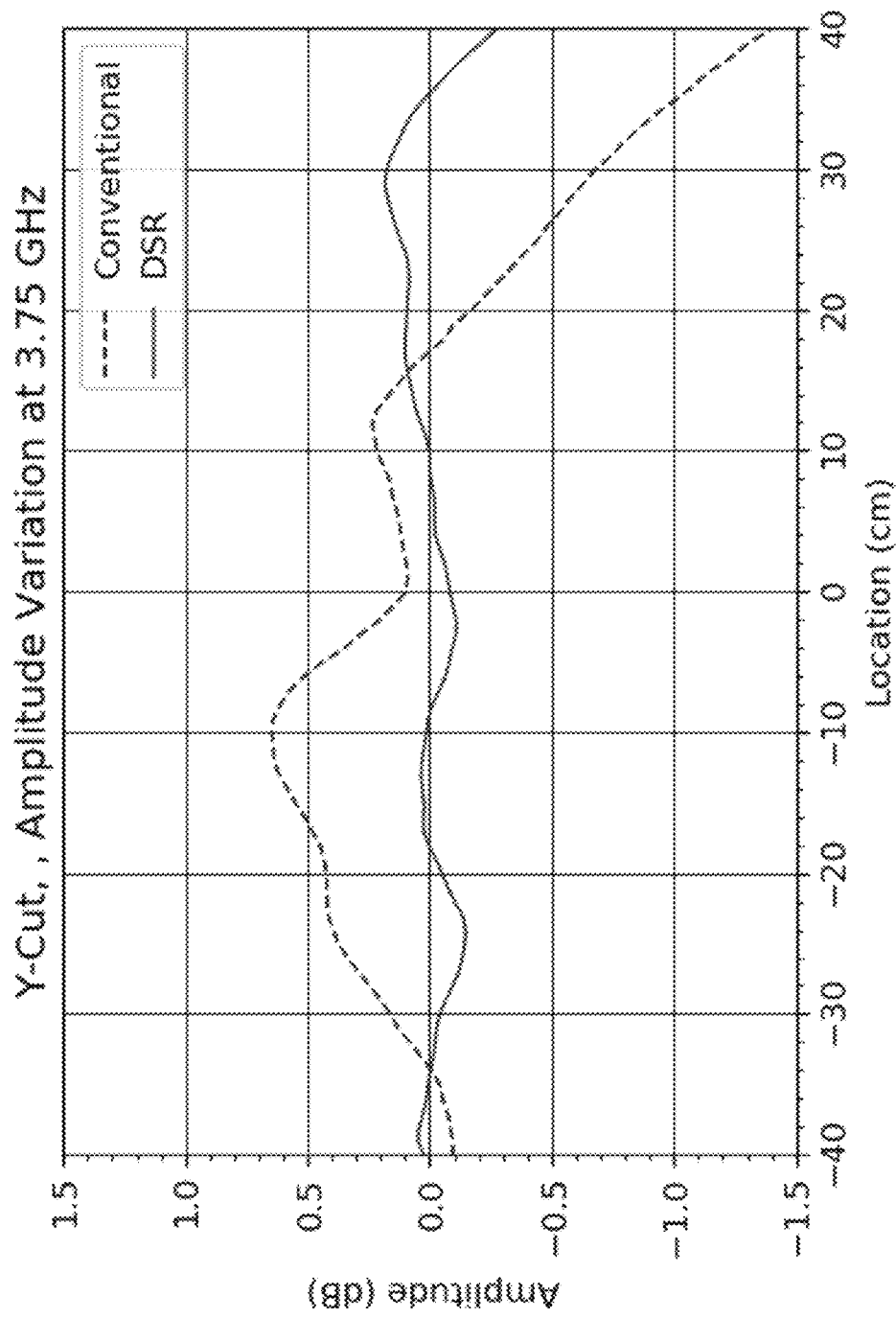
FIG. 14 shows the test result of variation of the amplitude of the plane electromagnetic wave in the quiet zone at frequency of 3.75 GHz generated by the compact antenna test range equipment of FIG. 6 and the conventional compact antenna test range equipment shown in FIG. 1 in the same-sized microwave darkroom and reflective surface.
Figure 15:
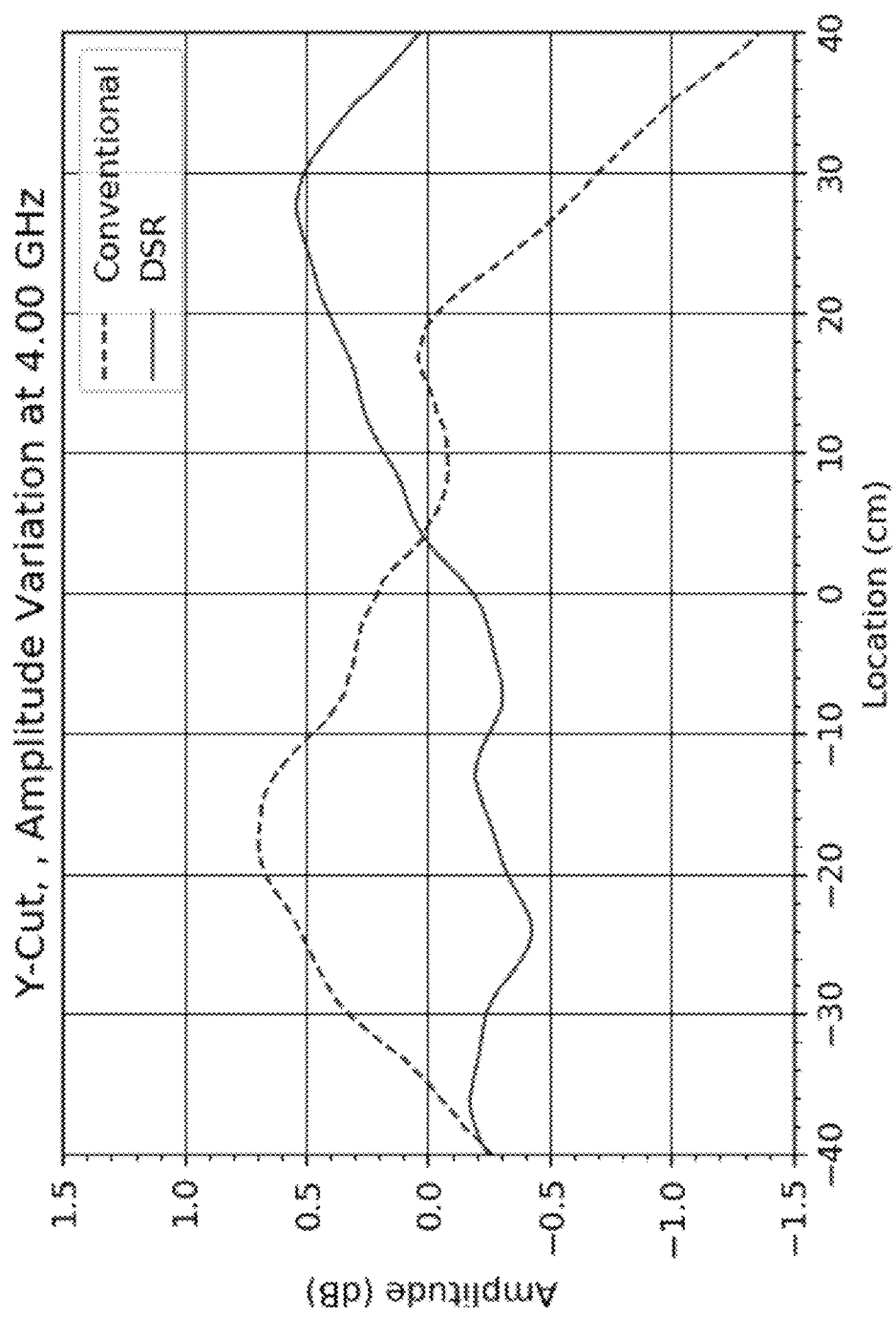
FIG. 15 shows the test result of variation of the amplitude of the plane electromagnetic wave in the quiet zone at frequency of 4.00 GHz generated by the compact antenna test range equipment of FIG. 6 and the conventional compact antenna test range equipment shown in FIG. 1 in the same-sized microwave darkroom and reflective surface.
Figure 16:
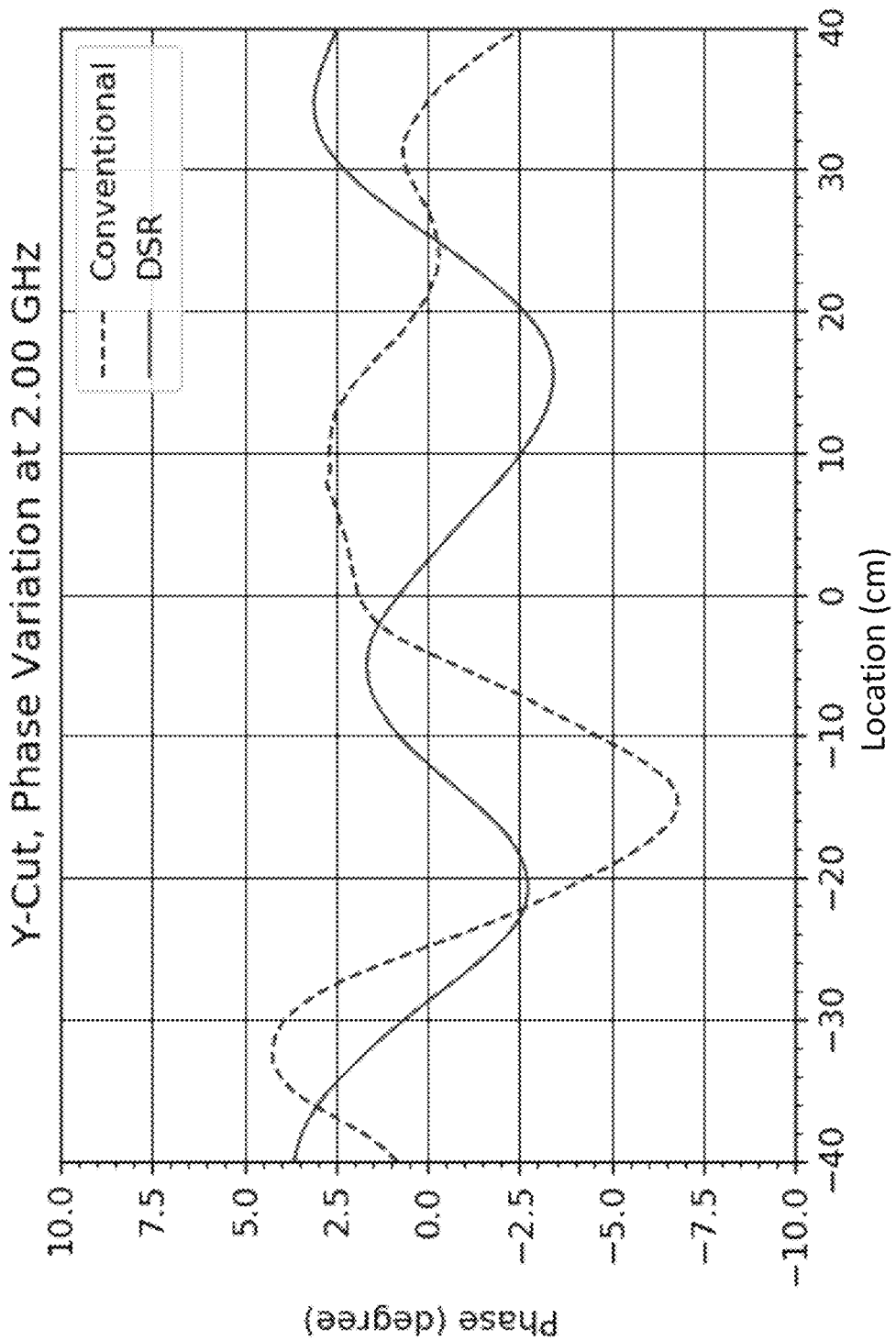
FIG. 16 shows the test result of variation of the phase of the plane electromagnetic wave in the quiet zone at frequency of 2.0 GHz generated by the compact antenna test range equipment of FIG. 6 and the conventional compact antenna test range equipment shown in FIG. 1 in the same-sized microwave darkroom and reflective surface.
Figure 17:
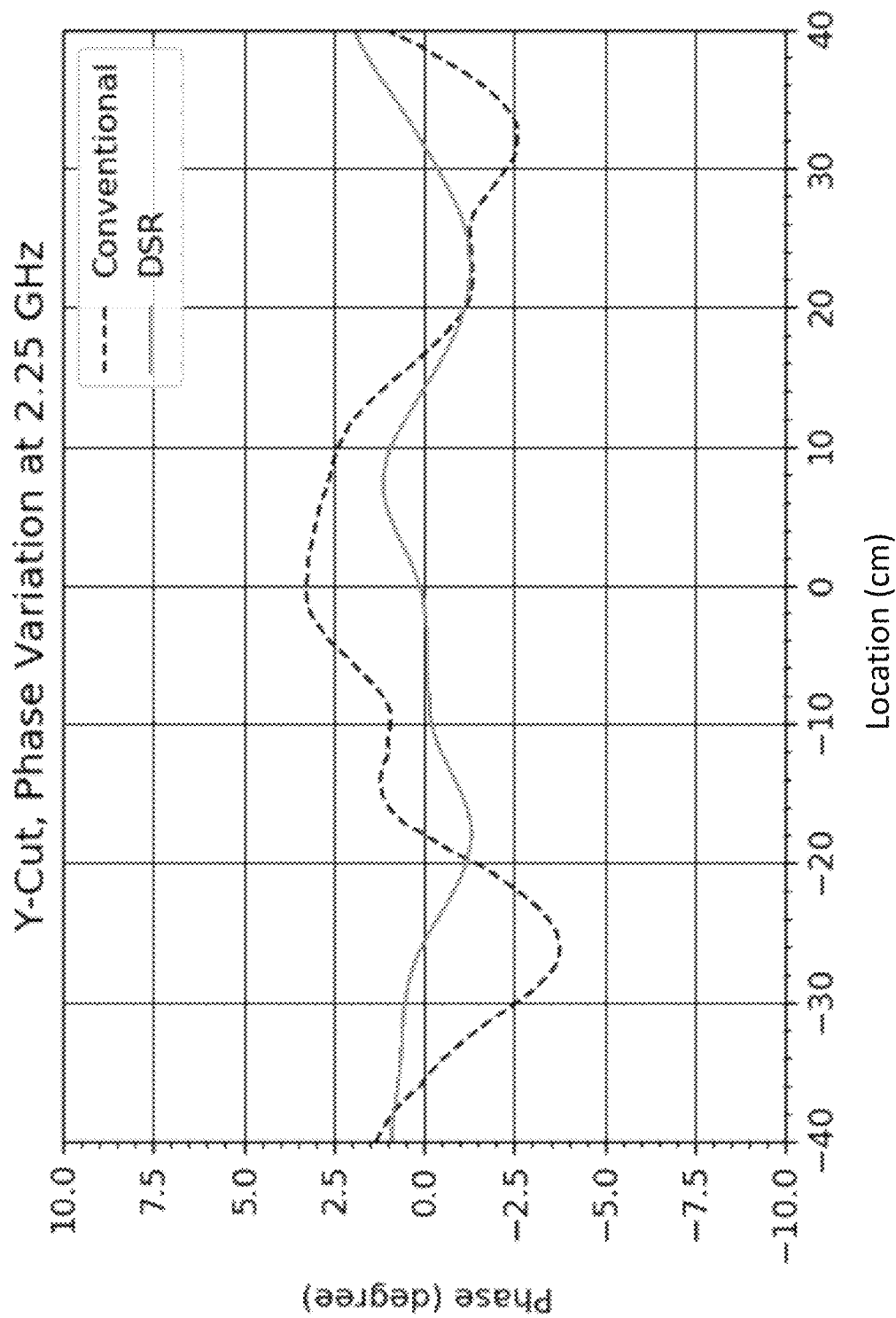
FIG. 17 shows the test result of variation of the phase of the plane electromagnetic wave in the quiet zone at frequency of 2.25 GHz generated by the compact antenna test range equipment of FIG. 6 and the conventional compact antenna test range equipment shown in FIG. 1 in the same-sized microwave darkroom and reflective surface.
Figure 18:
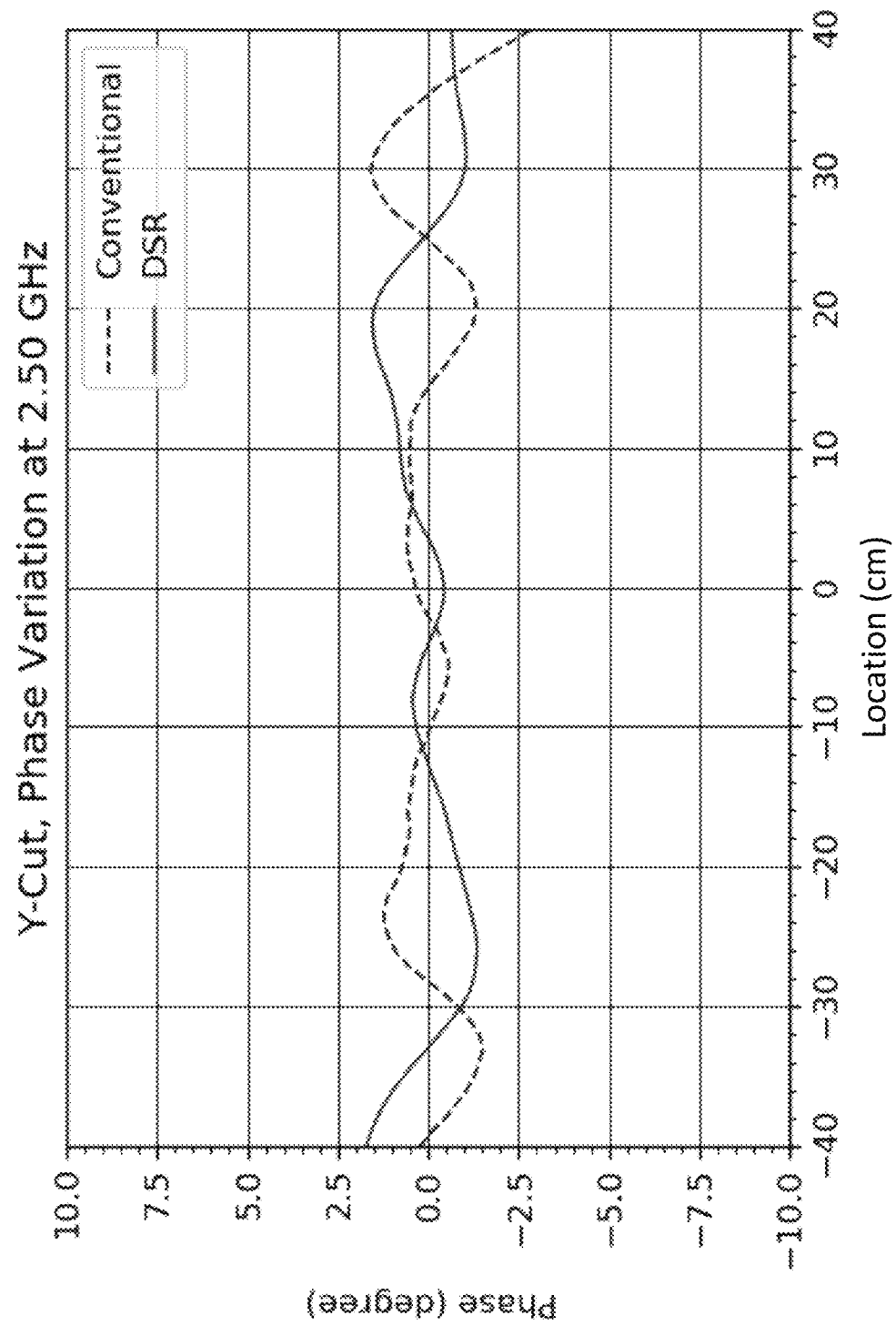
FIG. 18 shows the test result of variation of the phase of the plane electromagnetic wave in the quiet zone at frequency of 2.5 GHz generated by the compact antenna test range equipment of FIG. 6 and the conventional compact antenna test range equipment shown in FIG. 1 in the same-sized microwave darkroom and reflective surface.
Figure 19:
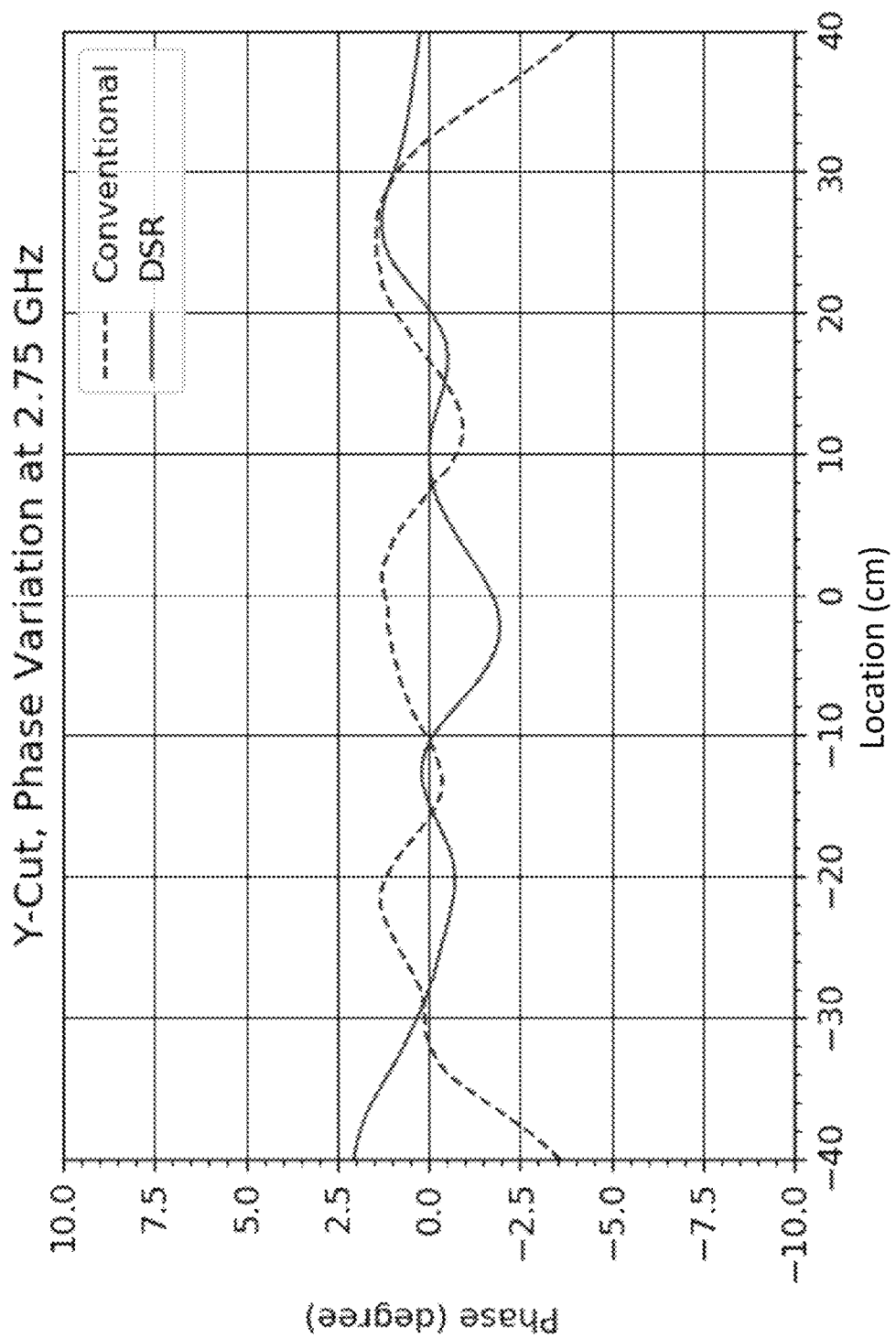
FIG. 19 shows the test result of variation of the phase of the plane electromagnetic wave in the quiet zone at frequency of 2.75 GHz generated by the compact antenna test range equipment of FIG. 6 and the conventional compact antenna test range equipment shown in FIG. 1 in the same-sized microwave darkroom and reflective surface.
Figure 20:
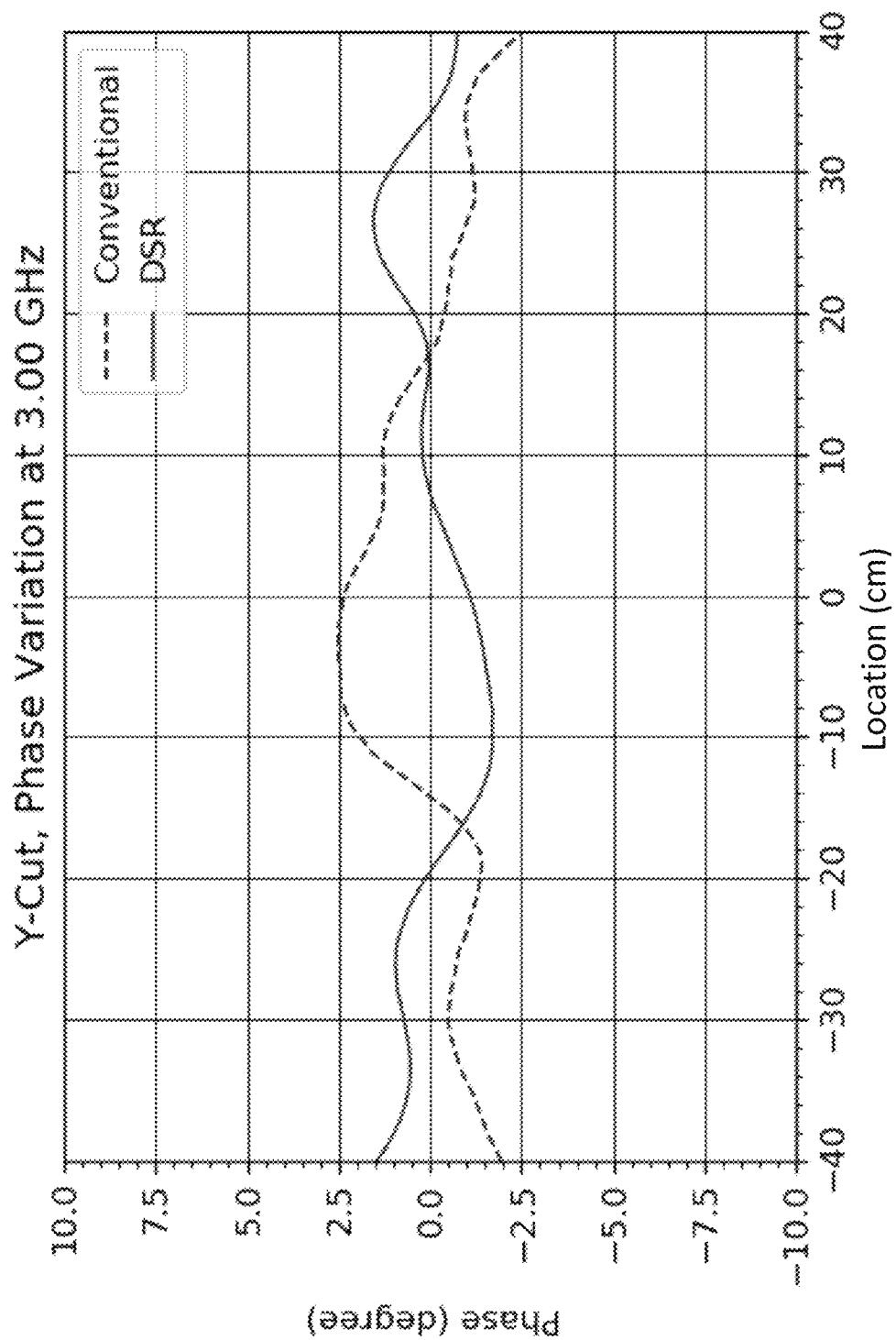
FIG. 20 shows the test result of variation of the phase of the plane electromagnetic wave in the quiet zone at frequency of 3.00 GHz generated by the compact antenna test range equipment of FIG. 6 and the conventional compact antenna test range equipment shown in FIG. 1 in the same-sized microwave darkroom and reflective surface.
Figure 21:
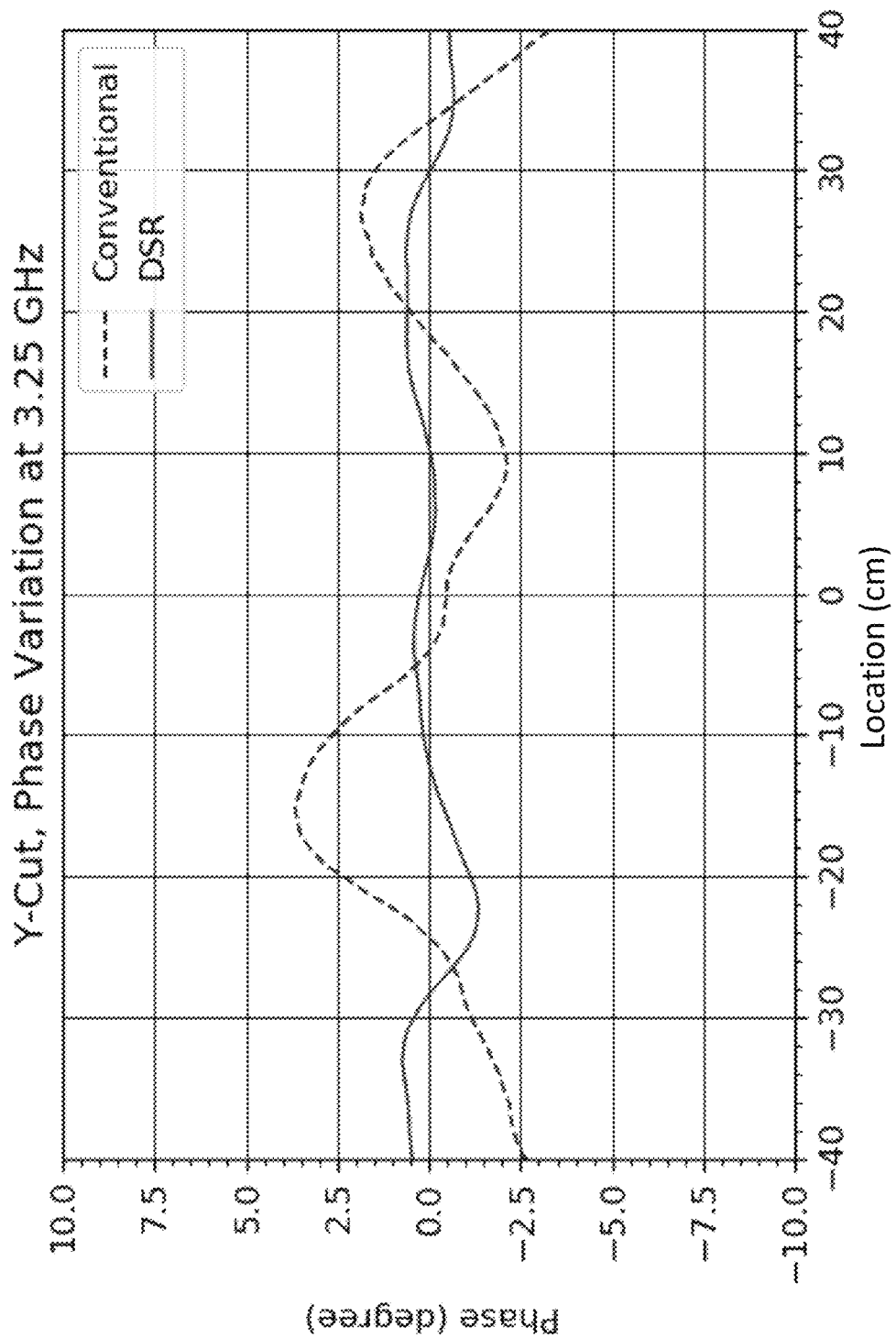
FIG. 21 shows the test result of variation of the phase of the plane electromagnetic wave in the quiet zone at frequency of 3.25 GHz generated by the compact antenna test range equipment of FIG. 6 and the conventional compact antenna test range equipment shown in FIG. 1 in the same-sized microwave darkroom and reflective surface.
Figure 22:
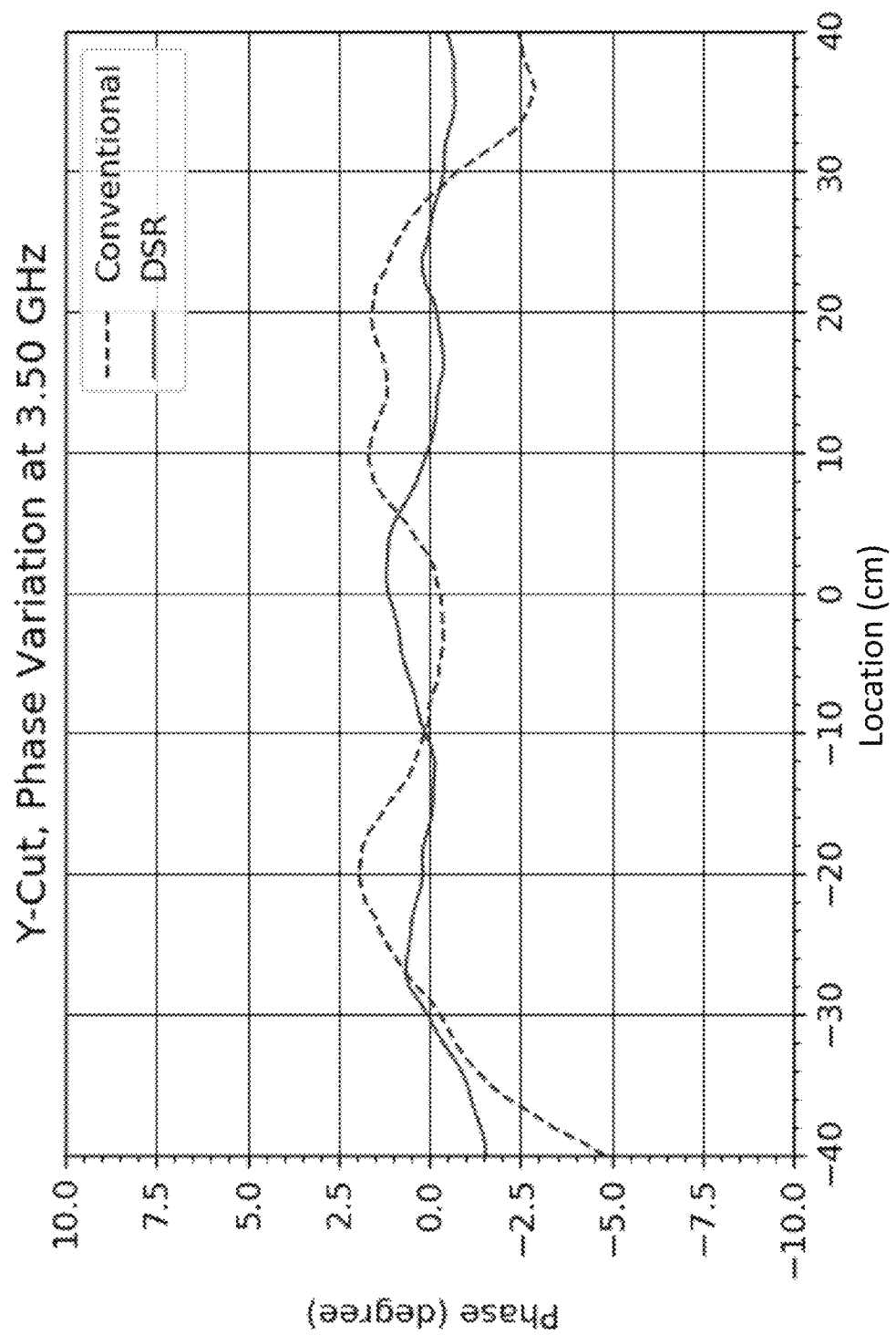
FIG. 22 shows the test result of variation of the phase of the plane electromagnetic wave in the quiet zone at frequency of 3.50 GHz generated by the compact antenna test range equipment of FIG. 6 and the conventional compact antenna test range equipment shown in FIG. 1 in the same-sized microwave darkroom and reflective surface.
Figure 23:
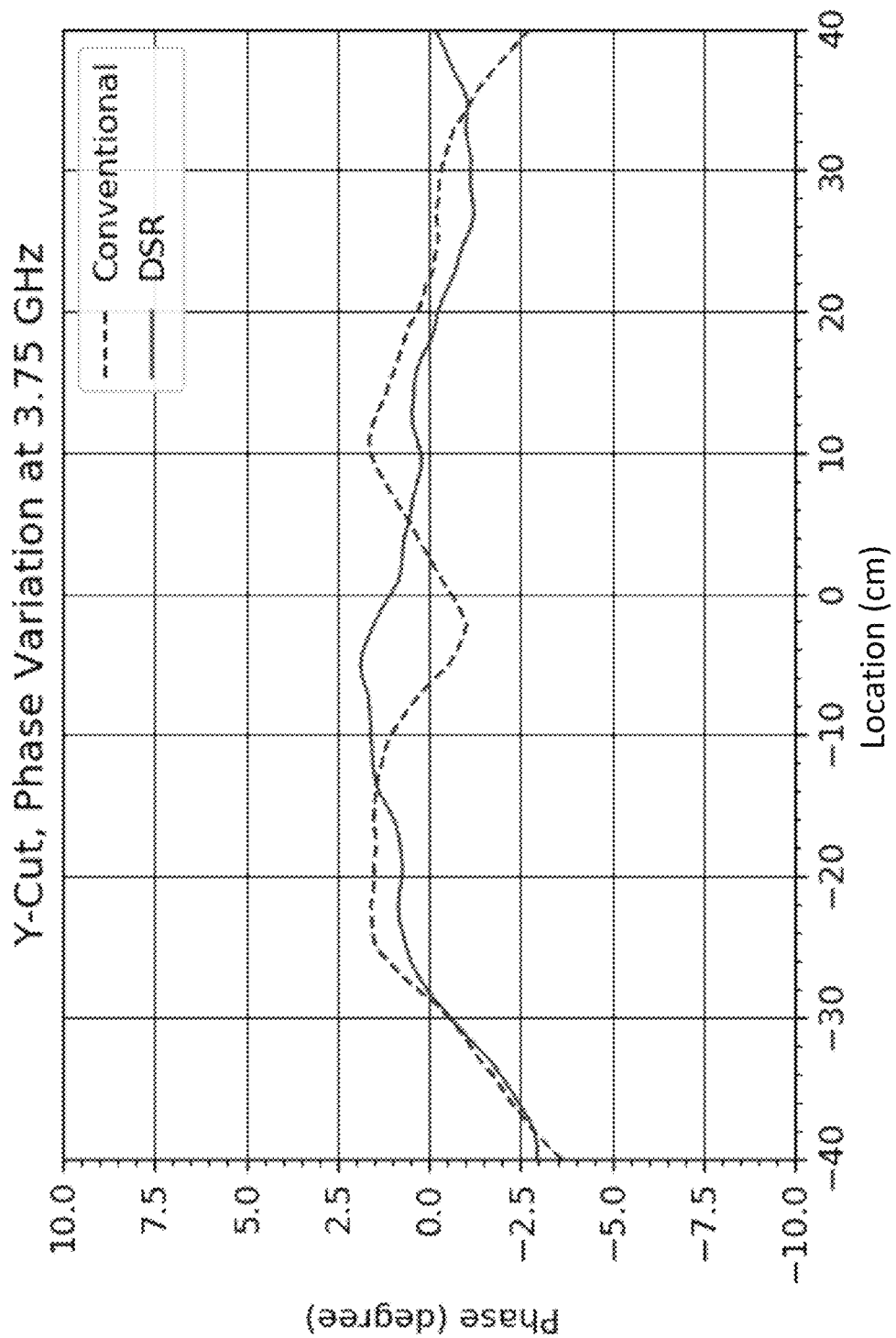
FIG. 23 shows the test result of variation of the phase of the plane electromagnetic wave in the quiet zone at frequency of 3.75 GHz generated by the compact antenna test range equipment of FIG. 6 and the conventional compact antenna test range equipment shown in FIG. 1 in the same-sized microwave darkroom and reflective surface.
Figure 24:
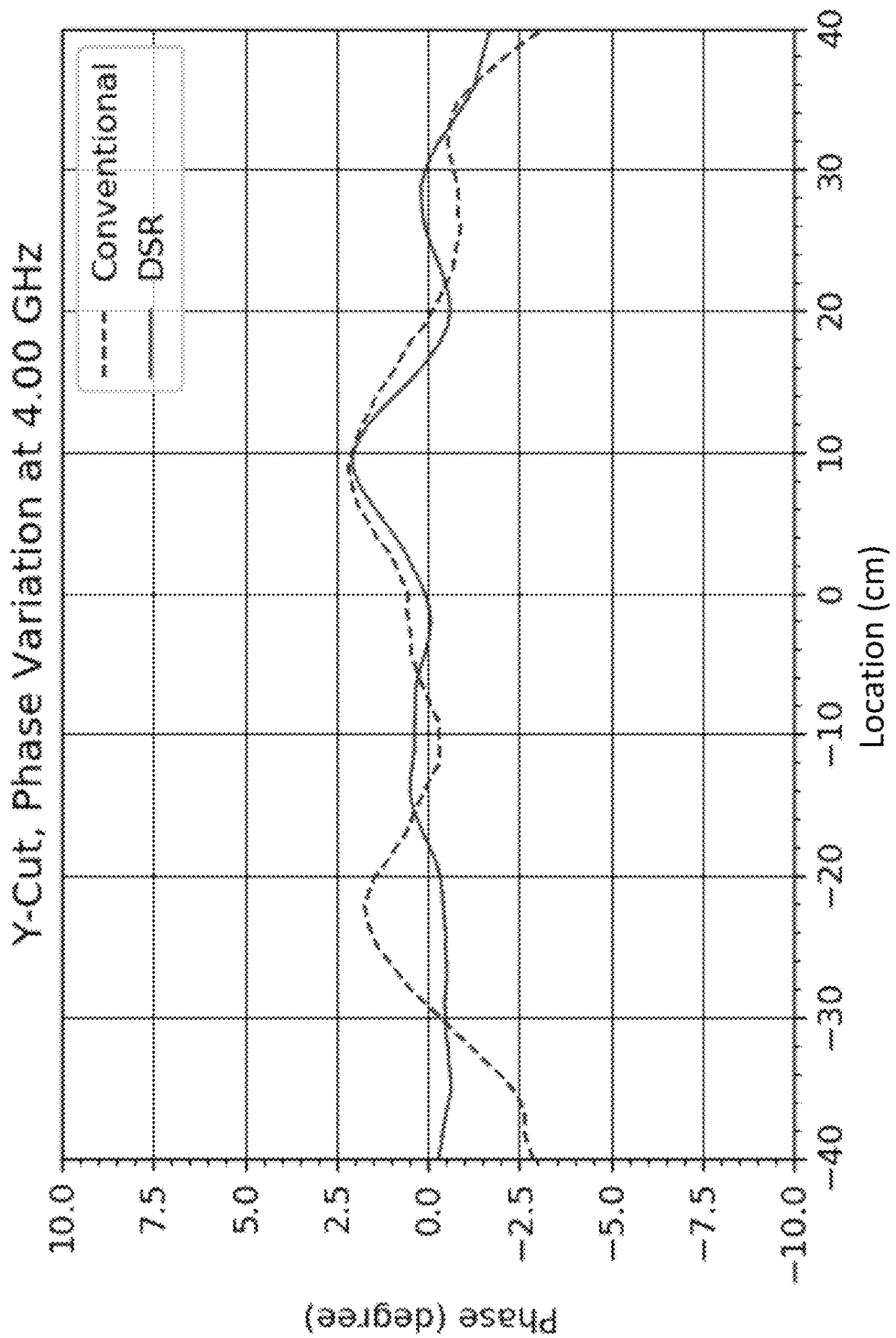
FIG. 24 shows the test result of variation of the phase of the plane electromagnetic wave in the quiet zone at frequency of 4.00 GHz generated by the compact antenna test range equipment of FIG. 6 and the conventional compact antenna test range equipment shown in FIG. 1 in the same-sized microwave darkroom and reflective surface.

The reflector 20 is disposed in the microwave darkroom 10. The reflector 20 has a polygonal reflecting surface 21, and the reflecting surface 21 has a plurality of corners 211, and the corners 211 are arranged to respectively align with the wall surfaces 11, 12, 13, 14. In this embodiment, the reflecting surface 21 is a diamond shape reflector with respect to the floor and ceiling of the microwave darkroom 10. The reflective surface 21 is a curved surface, such as a paraboloid. The reflector 20 has a base 22, the reflecting surface 21 is carried by the base 22, and the base 22 is set on the floor. In addition, as shown in FIG. 5, the reflective surface 21 of this embodiment has an inclination angle with respect to the floor, which corresponds to the position of the feeding antenna 30. In another embodiment, as shown in FIG. 6, the reflecting surface 21 may not have an inclination angle, or may be inclined to the left or to the right. The reflecting surface 21 has two intersecting diagonal lines D1 and D2, and the diagonal lines D1 and D2 of this embodiment have the same length. In this embodiment, the size of the reflecting surface 21 is 80 cm*80 cm, and the size of the test quiet zone is 60 cm*60 cm.

Figure 2:
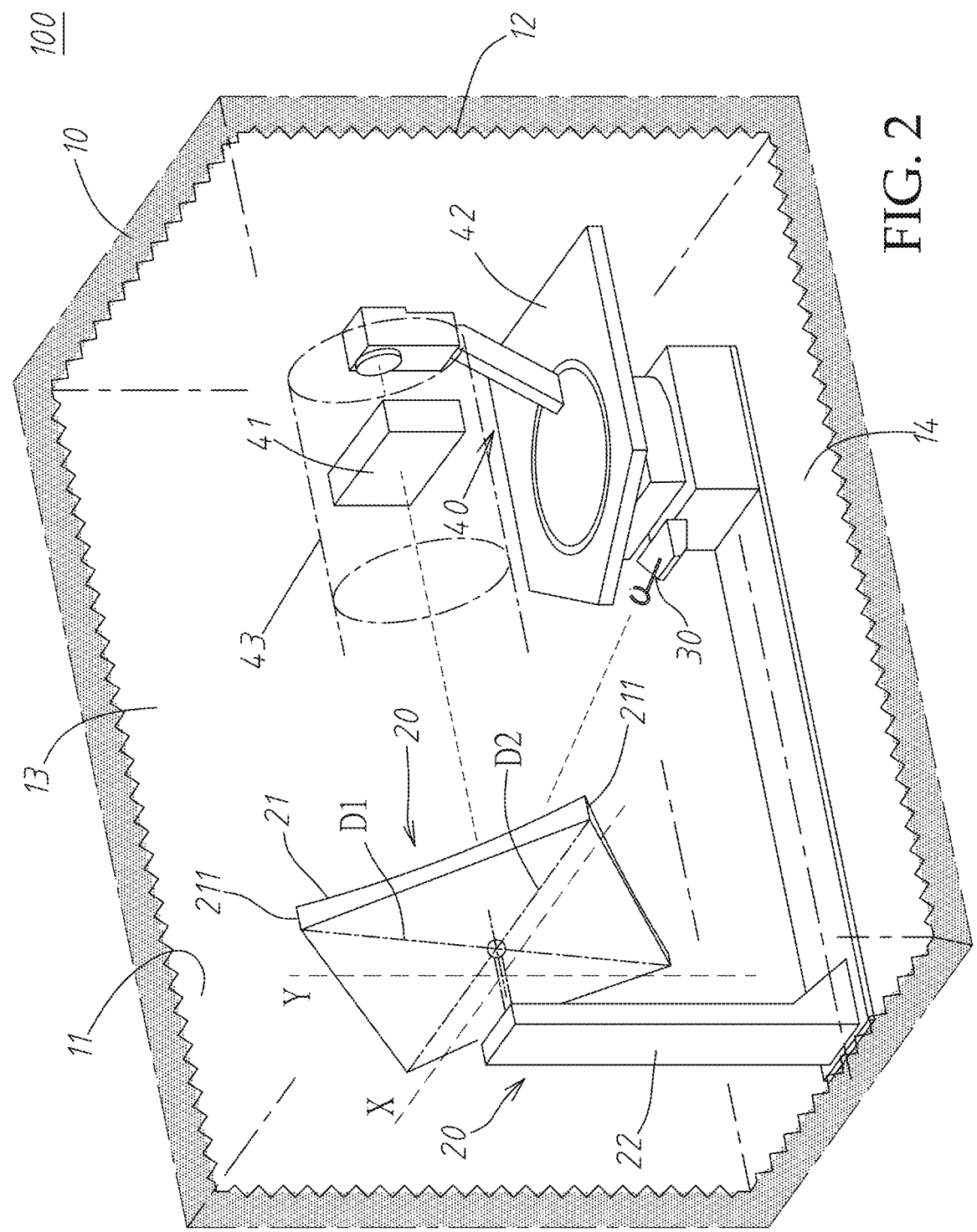
FIG. 2 is a perspective view of an embodiment of a compact antenna test range equipment of the present invention.
Figure 3:
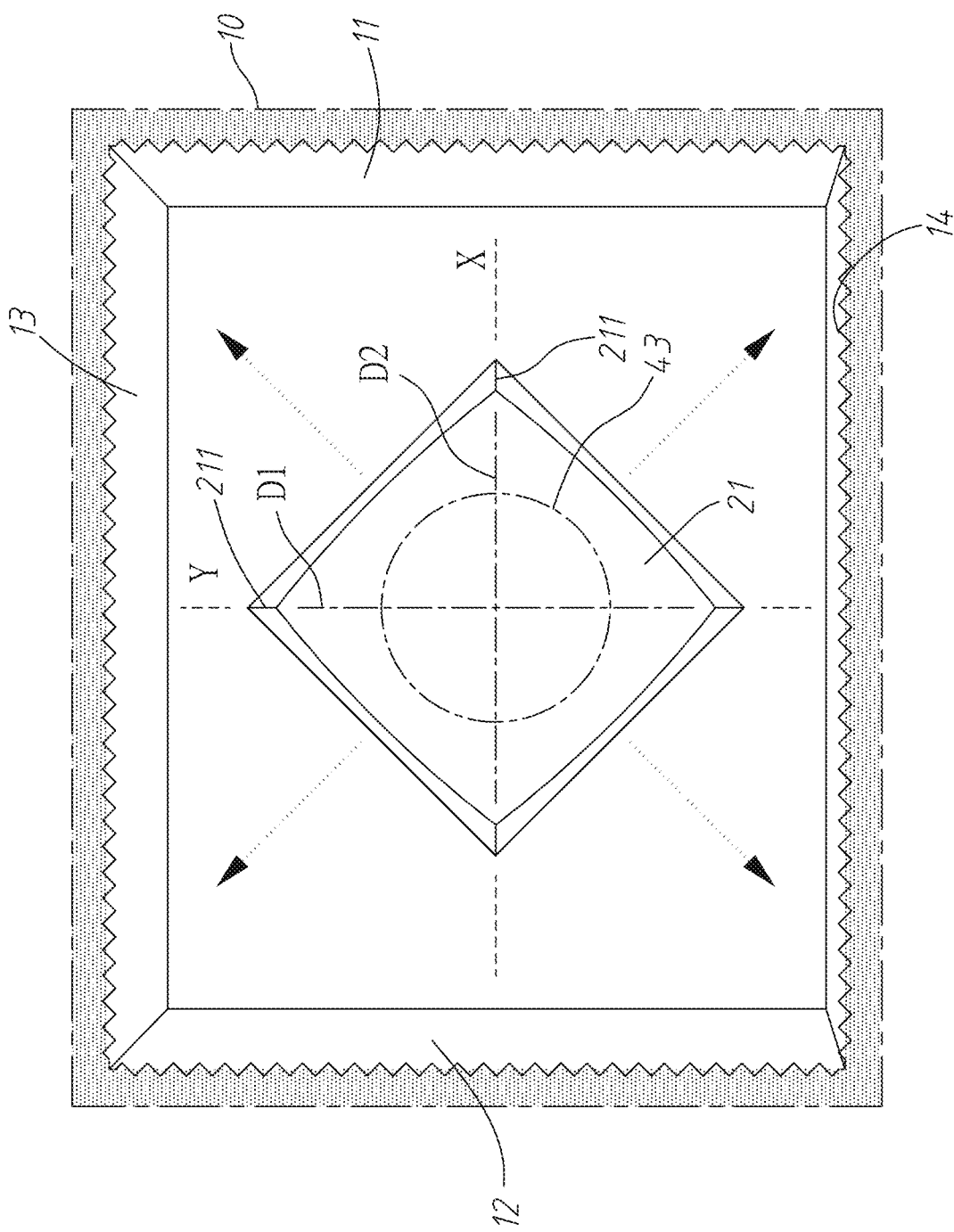
FIG. 3 is a schematic view of a reflector and a microwave darkroom of the compact antenna test range equipment of the present invention.

As shown in FIGS. 2, 3, and 5, the feeding antenna 30 is arranged in the microwave darkroom 10 and corresponds to any corner 211 of the reflecting surface 21. The feeding antenna 30 of this embodiment is arranged close to the floor and corresponds to the corner 211 of the reflective surface 21 close to the floor. The feeding antenna 30 is a point wave source, which emits electromagnetic waves toward the reflecting surface 21, and then the electromagnetic waves are reflected by the reflecting surface 21 to form a plane wave traveling to the test piece 41 located in the test quiet zone 43 for the testing of the test piece 41.

The test piece turntable 40 is arranged in the microwave darkroom 10 with a distance from the reflector 20, and the test piece 41 is installed on the test piece turntable 40 and located in the test quiet zone 43 to be excited by plane electromagnetic waves. The test piece turntable 40 has a rotating mechanism 42 that changes the angle of the normal line of the test piece 41 with respect to the plane electromagnetic wave front.

The corners 211 of the reflecting surface 21 aims at the wall surfaces 11, 12, 13, 14 of the microwave darkroom 10 so that the electromagnetic waves reflected and scattered by the corners 211 of the reflector 20 is relatively weak. Therefore the electromagnetic waves incident on the wall surfaces 11, 12, 13, 14 of the microwave darkroom 10 are relatively weak, so that the scattered interference clutter generated is relatively weak. However, the large reflected and scattered electromagnetic waves generated by the edge of the reflecting surface 21 are far away from the wall of the microwave darkroom 10. The energy illuminating the absorber on the walls 11, 12, 13, and 14 of the microwave darkroom 10 is lower, and it has a smaller off-normal incident angle which causes better absorption, so that the scattered interference clutter generated is relatively weak. As a conclusion, the quality of the plane wave in the test quiet zone 43 is maintained. Therefore, the electromagnetic waves that illuminate the walls 11, 12, 13, and 14 are aligned with the edge of the conventional reflective surface. The reflected and scattered electromagnetic waves reflected to the wall surface of the microwave darkroom are much weaker. Therefore, the scattered electromagnetic waves generated by the illumination of the absorbing material are weakened. The formation of interference clutters is thus weaker.

Please refer to FIG. 6, which shows another embodiment of the compact antenna test range equipment 100 of the present invention. The feeding antenna 30 of the compact antenna test range equipment 100 of this embodiment is arranged to correspond to the corner 211 on the lateral side of the reflecting surface 21. In this embodiment, the size of the reflecting surface 21 is 180 cm*180 cm, and the size of the test quiet zone is 80 cm*80 cm.

Figure 4:
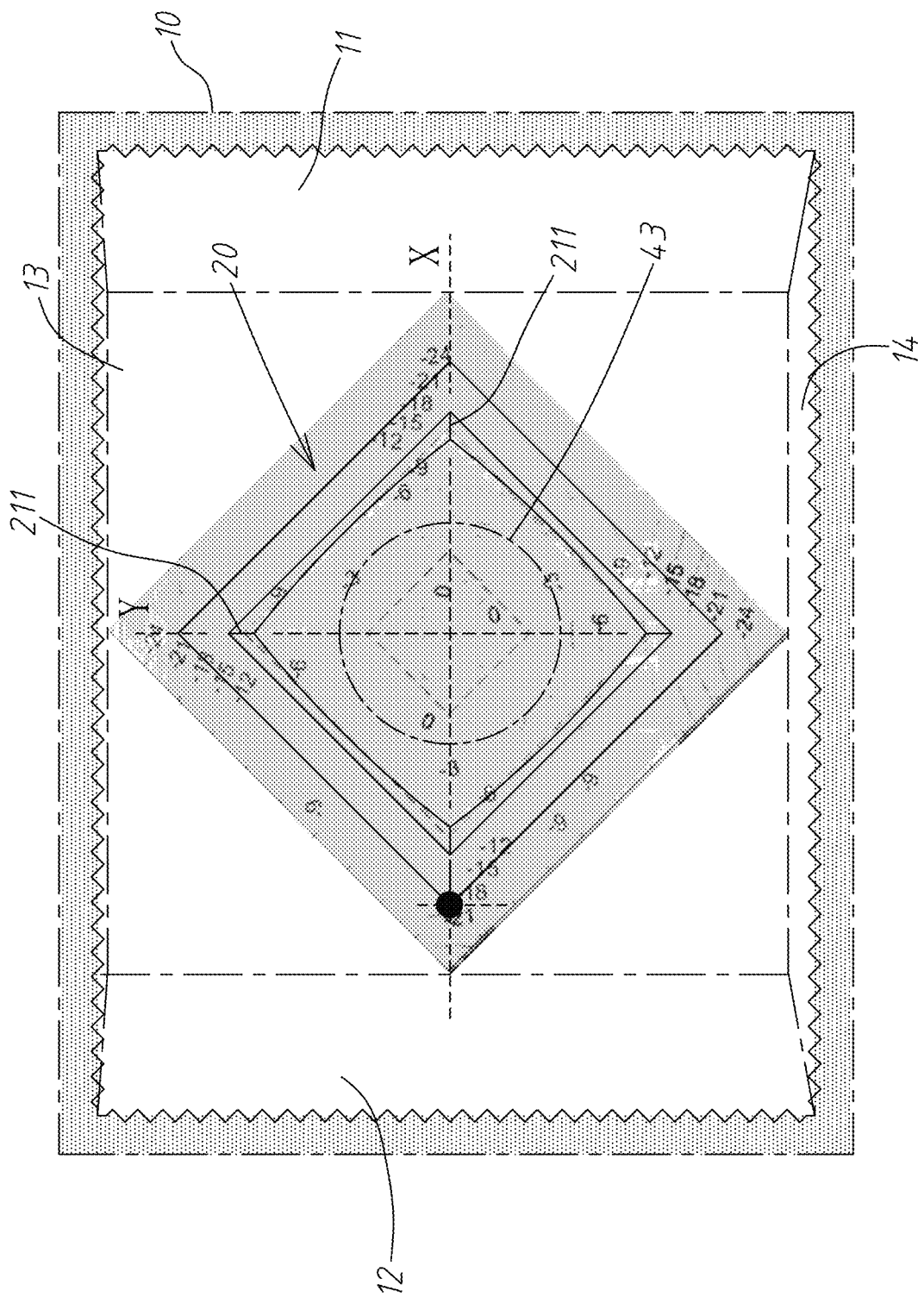
FIG. 4 is a schematic view of simulated electromagnetic field of the compact antenna test range equipment of FIG. 6.

As shown in FIG. 4, it is the result of the simulation of the reflected and scattered electromagnetic wave intensity of the compact antenna test range equipment 100 shown in the embodiment of FIG. 6. The electromagnetic wave intensity of the corner 211 close to the reflecting surface 21 is weaker than other areas. For example, the electromagnetic wave intensity simulated at the corner 211 is −18 dB~−24 dB, and the electromagnetic wave intensity simulated at0 the edge of the reflecting surface 21 is −9 dB~−12 dB.

The compact antenna test range equipment of the prevent invention includes the reflector with the corners aiming at the wall of the microwave darkroom. The electromagnetic waves reflected and scattered by the corners of the reflector are weak, so the electromagnetic waves incident on the wall of the microwave darkroom are relatively weak. Therefore, the scattered interference clutter generated by the wall is relatively weak. The reflected and scattered electromagnetic waves generated by the edge of the reflective surface are farther away from the wall of the microwave darkroom, and the energy illuminating to the wall is lower. It has a small off-normal angle of incidence and good absorption. Therefore, the scattered interference clutter is relatively weak. Based on the above factors, it will not interfere with the quality of the uniform plane electromagnetic wave in the quiet zone of the test. In addition, the electromagnetic waves reflected by the corners of the reflector to the turntable of the test piece located in the center of the test quiet zone are also weak, and the scattered interference waves generated by the turntable mechanism are also much smaller. The compact antenna test range equipment of the present invention can also retain the advantages of low interaction interference between the reflected wave and the feeding antenna in the conventional corner feed structure.

Please refer to FIGS. 7 to 15, which show the test results of the variation of the amplitude of the plane electromagnetic wave at a frequency of 2.0 GHz-4.0 GHz in the test quiet zone (+40 cm~−40 cm). The size of the reflecting surface of the present invention and the conventional one is of the same size and is tested in a microwave darkroom of the same size. The test results are shown in FIGS. 7 to 15, wherein the solid line represents the test data of the compact antenna test range equipment of the present invention, and the dashed line represents the test data of the conventional compact antenna test range equipment. As shown in the figures, the variation of the amplitude of the electromagnetic wave of the compact antenna test range equipment of the present invention is smaller than that of the conventional compact antenna test range equipment. Please refer to FIGS. 16 to 24, which show the test results of the phase variation of the plane electromagnetic wave in the quiet zone (+40 cm~–40 cm) at the frequency of 2.0 GHz-4.0 GHz. The solid line represents the test data of the compact antenna test range equipment of the present invention, and the dotted line represents the test data of the conventional compact antenna test range equipment. As shown in the figures, the phase variation of the electromagnetic wave of the compact antenna test range equipment of this invention is smaller than that of the compact antenna test range equipment. Therefore, the present invention does produce relatively weak scattering interference electromagnetic waves, whereby the plane electromagnetic waves in the test quiet zone are more uniform.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A compact antenna test range equipment, comprising:
   a microwave anechoic chamber comprises a plurality of surfaces connected to each other;
   a reflector disposed in the microwave anechoic chamber and comprising a reflecting surface having a diamond shape comprising four edges and four corners, each of the corners is located between two of the edges, wherein each of the corners aiming at one of the plurality of surfaces;
   a feeding antenna disposed in the microwave anechoic chamber and corresponding to any position of the reflecting surface; and
   a test turning table disposed in the microwave anechoic chamber and configured to bear a testing piece which is disposed in a quiet zone and exited by a plane electromagnetic wave;
   wherein the feeding antenna transmits electromagnetic waves to the reflecting surface so as to generate plane electromagnetic waves to the quiet zone or to receive electromagnetic waves radiating from the quiet zone;
   wherein the reflector, the feeding antenna, and the test turning table are located within an area defined by the plurality of surfaces of the microwave anechoic chamber;
   wherein each corner of the four corners of the reflector is positioned to extend toward a corresponding surface of the plurality of surfaces of the microwave anechoic chamber;
   wherein, when each corner of the four corners of the reflector is positioned to extend toward the corresponding surface of the plurality of surfaces of the microwave anechoic chamber, the feeding antenna transmits the electromagnetic waves to the reflecting surface so as to produce relatively weak scattering interference electromagnetic waves to generate more uniform plane electromagnetic waves in the test quiet zone, an interference wave entering the test quiet zone is reduced, and the test quiet zone has high-quality uniform plane electromagnetic waves.

2. The compact antenna test range equipment as claimed in claim 1, wherein the microwave anechoic chamber has four surfaces.

3. The compact antenna test range equipment as claimed in claim 2, wherein the reflecting surface has two diagonal lines.

4. The compact antenna test range equipment as claimed in claim 3, wherein the diagonal lines are perpendicular and have identical length.

5. The compact antenna test range equipment as claimed in claim 1, wherein the surfaces have wave absorbing material and wave absorbing structures.

6. The compact antenna test range equipment as claimed in claim 1, wherein the feeding antenna transmits the electromagnetic waves to a center of the reflecting surface, and the testing piece aims at the center to be excited by the plane electromagnetic waves.

7. The compact antenna test range equipment as claimed in claim 1, wherein the feeding antenna and the testing piece are disposed on the surface serving as a ground, and the reflecting surface has an inclined angle with respect to the ground.

8. The compact antenna test range equipment as claimed in claim 7, wherein the feeding antenna corresponds to one of the corners of the reflecting surface near the ground.

9. The compact antenna test range equipment as claimed in claim 7, wherein the feeding antenna corresponds to one lateral corner of the reflecting surface.

10. The compact antenna test range equipment as claimed in claim 1, wherein the test turning table comprises a rotating mechanism altering an angle of a normal line of the testing piece with respect to wave front of the plane electromagnetic waves.

* * * * *